United States Patent
Tsang et al.

(10) Patent No.: US 7,428,523 B2
(45) Date of Patent: Sep. 23, 2008

(54) PORTAL BRIDGE

(75) Inventors: Andy Tsang, San Jose, CA (US); Brandon Barber, Allen, TX (US)

(73) Assignee: Oracle International Corporation, Redwood Shores, CA (US)

( * ) Notice: Subject to any disclaimer, the term of this patent is extended or adjusted under 35 U.S.C. 154(b) by 521 days.

(21) Appl. No.: 10/354,914

(22) Filed: Jan. 30, 2003

(65) Prior Publication Data
US 2004/0010520 A1      Jan. 15, 2004

Related U.S. Application Data

(60) Provisional application No. 60/395,152, filed on Jul. 11, 2002.

(51) Int. Cl.
*G06F 17/30* (2006.01)
(52) U.S. Cl. .......... 707/2; 707/3; 707/10; 707/102; 707/203; 709/203
(58) Field of Classification Search ............. 707/10, 707/2–5, 104.1, 102, 100, 203; 709/203; 715/742
See application file for complete search history.

(56) References Cited

U.S. PATENT DOCUMENTS

| | | | |
|---|---|---|---|
| 5,077,666 A | 12/1991 | Brimm et al. ................. 705/2 |
| 5,455,953 A | 10/1995 | Russell ...................... 710/266 |
| 5,530,861 A | 6/1996 | Diamant et al. ............... 705/8 |
| 5,581,691 A | 12/1996 | Hsu et al. .................... 714/15 |
| 5,664,154 A | 9/1997 | Purcell et al. |
| 5,678,041 A | 10/1997 | Baker et al. .................. 707/9 |
| 5,692,125 A | 11/1997 | Schloss et al. ............... 705/9 |
| 5,708,780 A | 1/1998 | Levergood et al. ........ 709/229 |
| 5,721,900 A | 2/1998 | Banning et al. |
| 5,724,595 A | 3/1998 | Gentner |
| 5,732,408 A | 3/1998 | Takahashi |
| 5,764,890 A | 6/1998 | Glasser et al. .............. 713/202 |
| 5,815,703 A | 9/1998 | Copeland et al. |
| 5,848,273 A | 12/1998 | Fontana et al. |
| 5,944,824 A | 8/1999 | He .............................. 713/201 |

(Continued)

OTHER PUBLICATIONS

Leon, McAfee's NetTools Promises to Ease Network Desktop Diagnosis, InfoWorld, San Mateo, Jul. 24, 1995, vol. 17, Iss. 30, p. 53.

(Continued)

*Primary Examiner*—Cheryl Lewis
(74) *Attorney, Agent, or Firm*—Townsend and Townsend and Crew LLP

(57) ABSTRACT

Technology is disclosed for accessing multiple network resources through a single portal. A Portal Bridge directs requests from the portal to multiple network resources and channels responses from the network resources to the portal. The Portal Bridge receives a request from a portal that calls for a response from a targeted network resource. The Portal Bridge forwards a request to the targeted network resource to obtain the response sought by the portal's request. The Portal Bridge receives a response to the request from the targeted network resource. The Portal Bridge processes the response and forwards the processed response to the portal. During processing, the Portal Bridge replaces links in the response with links to the Portal Bridge. This enables the Portal Bridge to receive and properly route any portal requests arising out of the links.

71 Claims, 11 Drawing Sheets

U.S. PATENT DOCUMENTS

| | | | |
|---|---|---|---|
| 5,991,810 A | 11/1999 | Shapiro et al. | 709/229 |
| 5,999,911 A | 12/1999 | Berg et al. | 705/9 |
| 6,014,666 A | 1/2000 | Helland et al. | |
| 6,073,109 A | 6/2000 | Flores et al. | 705/8 |
| 6,078,747 A | 6/2000 | Jewitt | |
| 6,098,056 A | 8/2000 | Rusnak et al. | 705/75 |
| 6,131,120 A | 10/2000 | Reid | 709/225 |
| 6,134,634 A | 10/2000 | Marshall, Jr. et al. | |
| 6,138,104 A | 10/2000 | Marchak et al. | 705/9 |
| 6,141,778 A | 10/2000 | Kane et al. | 713/201 |
| 6,145,003 A | 11/2000 | Sanu et al. | |
| 6,151,531 A | 11/2000 | Frankel et al. | 700/90 |
| 6,158,010 A | 12/2000 | Moriconi et al. | 713/201 |
| 6,182,142 B1 | 1/2001 | Win et al. | 705/9 |
| 6,195,710 B1 | 2/2001 | Borgendale et al. | |
| 6,208,986 B1 | 3/2001 | Schneck et al. | 707/3 |
| 6,212,558 B1 | 4/2001 | Antur et al. | 709/221 |
| 6,253,239 B1 | 6/2001 | Shklar et al. | |
| 6,253,257 B1 | 6/2001 | Dundon | |
| 6,256,739 B1 | 7/2001 | Skopp et al. | 713/201 |
| 6,260,077 B1 | 7/2001 | Rangarajan et al. | |
| 6,266,420 B1 | 7/2001 | Langford et al. | 380/282 |
| 6,278,993 B1 * | 8/2001 | Kumar et al. | 707/3 |
| 6,279,043 B1 | 8/2001 | Hayward et al. | |
| 6,314,470 B1 | 11/2001 | Ward et al. | |
| 6,323,881 B1 | 11/2001 | Broulik et al. | |
| 6,338,097 B1 | 1/2002 | Krenzke et al. | 719/329 |
| 6,347,312 B1 | 2/2002 | Byrne et al. | 707/3 |
| 6,349,306 B1 | 2/2002 | Malik et al. | |
| 6,353,929 B1 | 3/2002 | Houston | |
| 6,366,913 B1 | 4/2002 | Fitler, Jr. et al. | 707/9 |
| 6,401,101 B1 | 6/2002 | Britton et al. | |
| 6,401,138 B1 | 6/2002 | Judge et al. | |
| 6,415,368 B1 | 7/2002 | Glance et al. | |
| 6,434,531 B1 | 8/2002 | Lancelot et al. | 705/3 |
| 6,442,567 B1 | 8/2002 | Retallick et al. | 709/104.1 |
| 6,490,655 B1 | 12/2002 | Kershaw | |
| 6,499,023 B1 | 12/2002 | Dong et al. | |
| 6,523,022 B1 | 2/2003 | Hobbs | |
| 6,529,941 B2 | 3/2003 | Haley et al. | |
| 6,539,379 B1 | 3/2003 | Vora et al. | 707/6 |
| 6,549,941 B1 | 4/2003 | Jaquith et al. | |
| 6,611,840 B1 | 8/2003 | Baer et al. | |
| 6,671,695 B2 | 12/2003 | McFadden | |
| 6,671,745 B1 | 12/2003 | Mathur et al. | |
| 6,701,368 B1 | 3/2004 | Chennapragada et al. | |
| 6,704,807 B1 | 3/2004 | Mathur et al. | |
| 6,704,873 B1 | 3/2004 | Underwood | |
| 6,708,170 B1 | 3/2004 | Byrne et al. | |
| 6,721,804 B1 * | 4/2004 | Rubin et al. | 709/246 |
| 6,732,178 B1 * | 5/2004 | Van Horne et al. | 709/227 |
| 6,732,179 B1 | 5/2004 | Brown et al. | |
| 6,741,853 B1 * | 5/2004 | Jiang et al. | 455/418 |
| 6,760,750 B1 | 7/2004 | Boneh et al. | |
| 6,768,988 B2 | 7/2004 | Boreham et al. | |
| 6,785,686 B2 | 8/2004 | Boreham et al. | |
| 6,785,713 B1 | 8/2004 | Freeman et al. | |
| 6,785,726 B1 | 8/2004 | Freeman et al. | |
| 6,839,701 B1 | 1/2005 | Baer et al. | |
| 6,880,086 B2 | 4/2005 | Kidder et al. | |
| 6,948,135 B1 | 9/2005 | Ruthfield et al. | |
| 7,013,435 B2 | 3/2006 | Gallo et al. | |
| 7,013,469 B2 | 3/2006 | Smith et al. | |
| 7,035,926 B1 | 4/2006 | Cohen et al. | |
| 7,039,871 B2 | 5/2006 | Cronk | |
| 7,069,330 B1 | 6/2006 | McArdle et al. | |
| 7,076,784 B1 | 7/2006 | Russell et al. | |
| 7,120,914 B1 | 10/2006 | Manthos et al. | |
| 2002/0032684 A1 | 3/2002 | Kobayashi et al. | 707/100 |
| 2002/0038306 A1 | 3/2002 | Griffin et al. | |
| 2002/0049749 A1 | 4/2002 | Helgeson et al. | |
| 2002/0067370 A1 | 6/2002 | Forney et al. | |
| 2002/0073180 A1 | 6/2002 | Dewhurst et al. | |
| 2002/0083178 A1 | 6/2002 | Brothers | |
| 2002/0138763 A1 | 9/2002 | Delany et al. | |
| 2003/0028752 A1 | 2/2003 | Fu et al. | |
| 2003/0037052 A1 | 2/2003 | Kitain et al. | |
| 2003/0055806 A1 | 3/2003 | Wong et al. | |
| 2003/0083908 A1 | 5/2003 | Steinmann | |
| 2003/0088708 A1 | 5/2003 | Lewallen | |
| 2003/0105733 A1 | 6/2003 | Boreham et al. | |
| 2003/0105742 A1 | 6/2003 | Boreham et al. | |
| 2003/0115196 A1 | 6/2003 | Boreham et al. | |
| 2003/0115548 A1 | 6/2003 | Melgar | |
| 2003/0120593 A1 | 6/2003 | Bansal et al. | |
| 2003/0120601 A1 | 6/2003 | Ouye et al. | |
| 2003/0144982 A1 | 7/2003 | Reulein et al. | |
| 2003/0145074 A1 | 7/2003 | Penick | 709/203 |
| 2003/0204481 A1 | 10/2003 | Lau | |
| 2003/0217127 A1 | 11/2003 | Sinn | |
| 2003/0217333 A1 | 11/2003 | Smith et al. | |
| 2004/0003351 A1 | 1/2004 | Sommerer et al. | |
| 2004/0024762 A1 | 2/2004 | Agarwal et al. | |
| 2005/0240490 A1 | 10/2005 | Mackey | |

OTHER PUBLICATIONS

Cooney, IBM rolls out host- and server-based mgmt. apps, Network World, Framingham, Feb. 6, 1995, vol. 12, Iss. 6, pp. 6-7.
Walsh, Remedy releases three applications for help-desk suite, InfoWorld, San Mateo, Apr. 21, 1997, vol. 19, Iss. 16, p. 34.
Schmersal, Testing to maintain service standards, Communications News, Nokomis, Mar. 1998, vol. 35, Iss. 3, pp. 22-23.
Musthaler, The trouble with help desk selection, Network World, Framingham, Feb. 20, 1995, vol. 12, Iss. 8, p. 35-39.
Clear Trust, Unified Access Management, Securant Technologies, Inc., pp. 1-23, 1997.
SiteMinder Agent Operations, Verson 4.0, Netegrity Inc., 1997.
SiteMinder Deployment Guide, Version 4.0, Netegrity Inc., 1997.
SiteMinder Policy Server Operations Guide, Version 4.0, Netegrity Inc., 1997.
SiteMinder Developer's API Guide, Version 4.0, Netegrity Inc., 1997.
SiteMinder Installation Guide, Version 4.0, Netegrity Inc., 1997.
U.S. Appl. No. 10/314,888, Office Action dated Jan. 26, 2006, 31 pages.
U.S. Appl. No. 10/327,607, Office Action dated Feb. 13, 2006, 5 pages.
U.S. Appl. No. 10/345,873, Office Action dated Sep. 9, 2005, 13 pages.
U.S. Appl. No. 10/345,873, Office Action dated Mar. 10, 2006, 7 pages.
U.S. Appl. No. 10/354,913, Office Action dated Sep. 9, 2003, 19 pages.
U.S. Appl. No. 10/354,913, Final Office Action dated Apr. 6, 2004, 22 pages.
U.S. Appl. No. 10/354,913, Office Action dated Apr. 15, 2005, 20 pages.
U.S. Appl. No. 10/354,913, Final Office Action dated Dec. 5, 2005, 15 pages.
Kim, K.H., "APIs for Real-Time Distributed Object Programming", Computer, IEEE Jun. 2000, pp. 72-80.
McLellan, et al., "Building More Usable APIs", IEEE Software, pp. 78-86, May/Jun. 1998.
Saba—Products, Saba Enterprise 5, dated 1997-2006, 2 pages.
Saba—Company, dated 1997-2006, 1 page.
Saba—Solutions, Competency-Driven HCM, dated 1997-2006, 1 page.
Saba—Talent, dated 1997-2006, 2 pages.
Saba—Collaboration, dated 1997-2006, 1 page.
Stets, et al., "Component-Based APIs for Versioning and Distributed Applications", IEEE, pp. 54-61, 1999.
U.S. Appl. No. 10/314,888, Office Action dated Jul. 26, 2006, 26 pages.

U.S. Appl. No. 10/327,607, Office dated Apr. 18, 2006, 33 pages.
U.S. Appl. No. 10/328,920, Office Action dated May 31, 2006, 20 pages.
U.S. Appl. No. 10/354,913, Office Action dated May 12, 2005, 16 pages.
U.S. Appl. No. 09/570,276, Office Action dated Nov. 14, 2006, 28 pages.
U.S. Appl. No. 10/314,888, Office Action dated Feb. 9, 2007, 34 pages.
U.S. Appl. No. 10/325,465, Office Action dated Sep. 19, 2006, 25 pages.
U.S. Appl. No. 10/325,465, Final Office Action dated Apr. 4, 2007, 25 pages.
U.S. Appl. No. 10/325,465, Advisory Action dated Jun. 19, 2007, 3 pages.
U.S. Appl. No. 10/327,607, Office Action dated Apr. 30, 2007, 31 pages.
U.S. Appl. No. 10/345,879, Office Action dated Oct. 5, 2006, 30 pages.
U.S. Appl. No. 10/952,592, Final Office Action dated May 3, 2007, 54 pages.

* cited by examiner

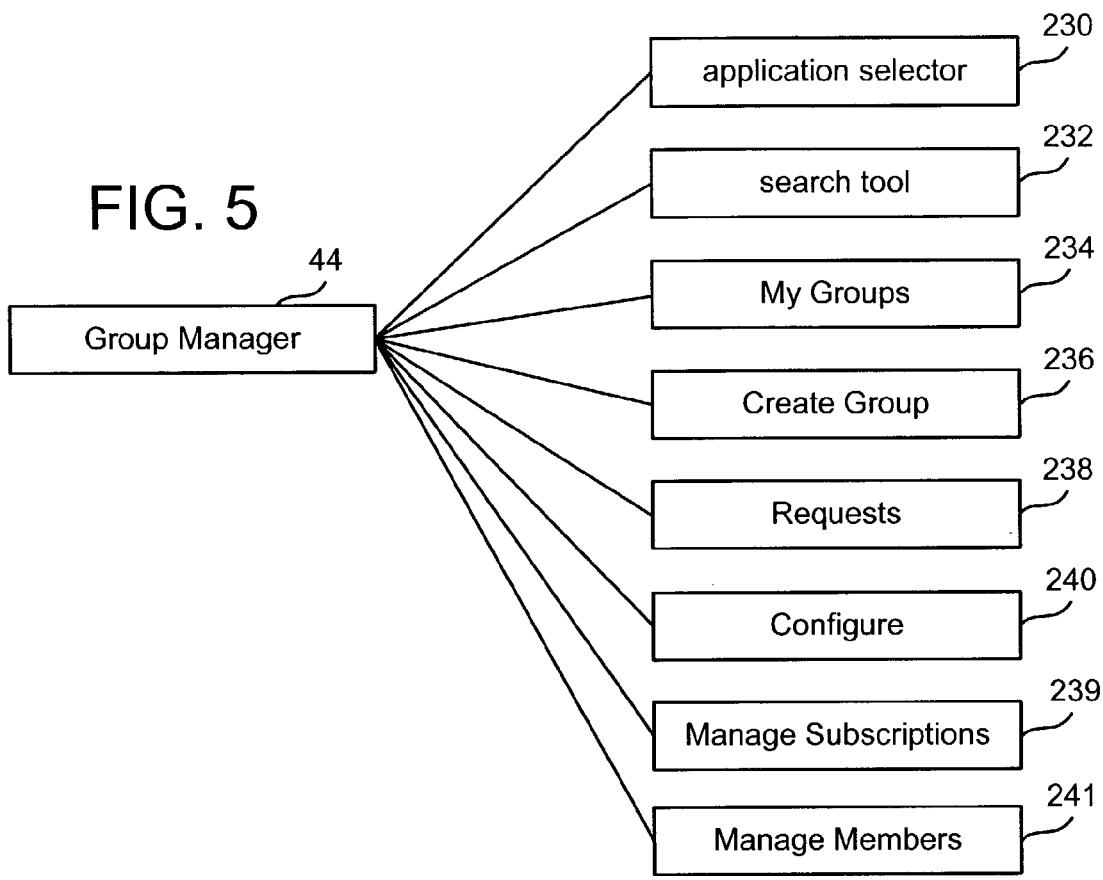
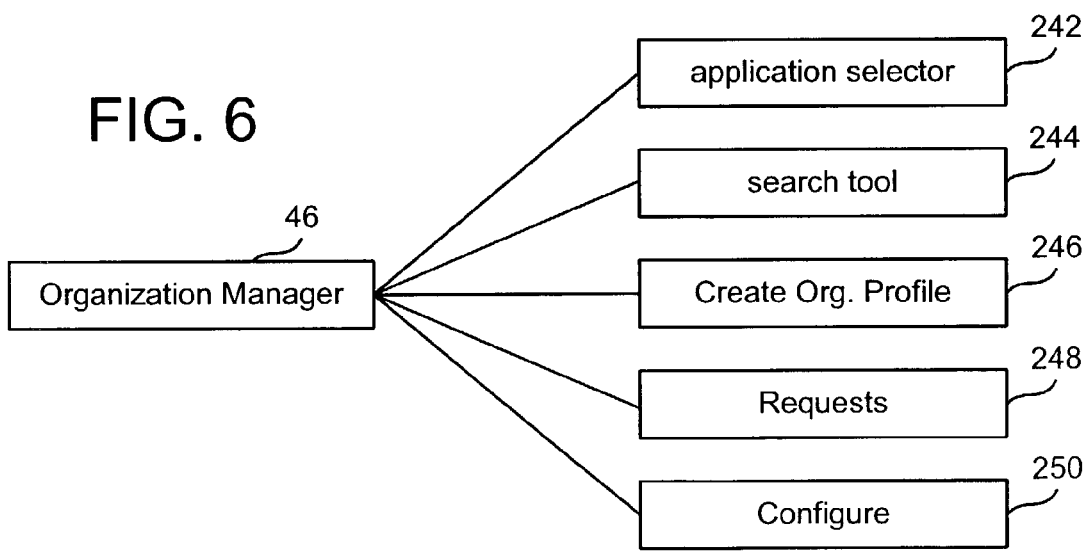

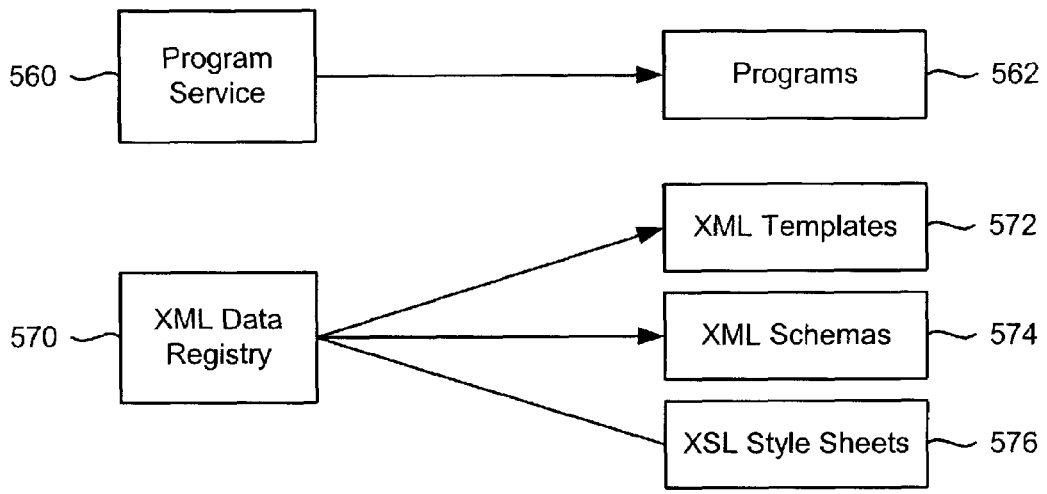
FIG. 13
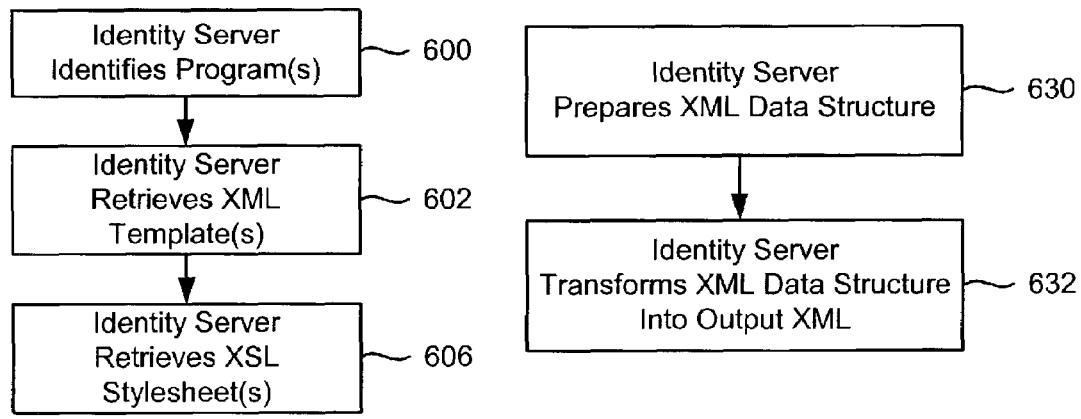
FIG. 14
FIG. 15

PORTAL BRIDGE

This application claims the benefit of U.S. Provisional Application No. 60/395,152, "Access and Identity System," filed on Jul. 11, 2002, which is incorporated herein by reference.

CROSS-REFERENCE TO RELATED APPLICATIONS

This Application is related to "Preparing Output XML Based on Selected Programs and XML Templates," by Michele C. Lee, U.S. patent application Ser. No. 09/997,410 now U.S. Pat. No. 6,782,379, filed Nov. 30, 2001, and incorporated herein by reference in its entirety.

BACKGROUND OF THE INVENTION

1. Field of the Invention

The present invention is directed to technology for accessing network resources through portals.

2. Description of the Related Art

With the growth of the Internet, the use of networks, and other information technologies, Identity Systems have become more popular. In general, an Identity System provides for the creation, removal, editing and other managing of identity information stored in various types of data stores. The identity information pertains to users, groups, organizations and/or things. For each entry in the data store, a set of attributes are stored. For example, the attributes stored for a user may include a name, address, employee number, telephone number, email address, user ID and password. The Identity System can also manage access privileges that govern what an entity can view, create, modify or use in the Identity System. Often, this management of access privileges is based on one or more specific attributes, membership in a group and/or association with an organization.

In some instances, an organization provides its member with access to an Identity System through a portal. For example, the organization's web page may include a link selector, such as a button, icon, or address entry field that a member can use to address and access an Identity System application or resource. In other implementations, portals provide access to network resources unrelated to Identity System operations. The scope of network resources accessed using portals is very broad—encompassing any type of resource that can be addressed and accessed over any type of network, such as applications, data stores, and websites.

Identity System users typically need access to multiple network resources within the Identity System. For example, an Identity System may include separate applications for managing users, groups, and organizations. Each application is separately addressable as a network resource. Unfortunately, traditional portals only provide direct access to a single network resource. This results in the need to use multiple portals for directly interacting with each Identity System application. Otherwise, a user must direct a single portal to a primary application within the Identity System and navigate to other desired Identity System applications without the use of the portal. This can be very inefficient when the primary Identity System application is not the Identity System application desired by the user.

The same dilemma occurs when a user desires direct portal access to any set of applications, such as network resources for multiple financial institutions—a separate portal is required for each financial institution. It is desirable for a user to directly access multiple network resources through a single portal. This would benefit Identity System users, as well as users of various network resources.

Some Identity System users also employ an Access System. An Access System provides for the authentication and authorization of users attempting to access resources. For efficiency purposes, there is an advantage to integrating the Identity System and the Access System. Additionally, integrating the Identity System and the Access System allows for single-sign-on functionality across multiple resources. Thus, there is also a need for providing access through a single portal to multiple network resources associated with Access Systems and integrated Identity/Access Systems.

SUMMARY OF THE INVENTION

The present invention, roughly described, pertains to technology for accessing multiple network resources through a single portal. A Portal Bridge facilitates communication between multiple network resources and a single portal. The Portal Bridge directs requests from the portal to multiple network resources and channels responses from the network resources to the portal. In one embodiment, the multiple network resources include applications in an Identity System. Further embodiments support network resources related to an Access System or an integrated Identity/Access System. In additional embodiments, network resources can be unrelated to Identity Systems, Access Systems or integrated Identity/Access Systems.

In one implementation, the Portal Bridge receives a request from a portal. The request calls for a response from a network resource, such an application in an Identity System. One example of a request is a Uniform Resource Locator ("URL") that identifies the Portal Bridge as its destination. The request also includes a parameter set that specifies the targeted network resource and the response being sought. In various embodiments, the request may be implemented in a variety of formats using different communication protocols.

The Portal Bridge forwards a request to the targeted network resource to obtain the response desired by the portal user. The Portal Bridge uses the parameter set in the portal's request to formulate the request to the targeted network resource. The Portal Bridge receives a response to the request from the targeted network resource. The Portal Bridge processes the response and forwards it to the portal.

In one processing implementation, the Portal Bridge formats the response to be compatible with the portal and replaces all links in the response with links to the Portal Bridge. In one example, the Portal Bridge converts an Extensible Mark-up Language ("XML") response from the targeted network resource into a Hypertext Mark-up Language ("HTML") response for the portal. Different formats can be employed in further implementations.

In some instances, the response from the targeted network resource includes links back to the targeted network resource. For example, the response may include a link associated with a button, and selecting the button causes the portal to issue a request to the targeted network resource. The Portal Bridge modifies this link, so that selecting the button causes the portal to issue a request to the Portal Bridge. In response to the request, the Portal Bridge retrieves a desired response from the targeted network resource.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers. In one embodiment, software implementing the present invention is used to program one or more processors. The processors can be in communication with one or more storage devices, peripherals and/or communication interfaces.

These and other objects and advantages of the present invention will appear more clearly from the following description in which the preferred embodiment of the invention has been set forth in conjunction with the drawings.

BRIEF DESCRIPTION OF THE DRAWINGS

FIG. 5 is a block diagram depicting the Group Manager.

FIG. 6 is a block diagram depicting the Organization Manager.

FIG. 13 is a block diagram illustrating a program service and XML data registry.

FIG. 14 is a flowchart describing a process for translating a request.

FIG. 15 is a flowchart describing a process for preparing Output XML.

DETAILED DESCRIPTION

Figure 1:
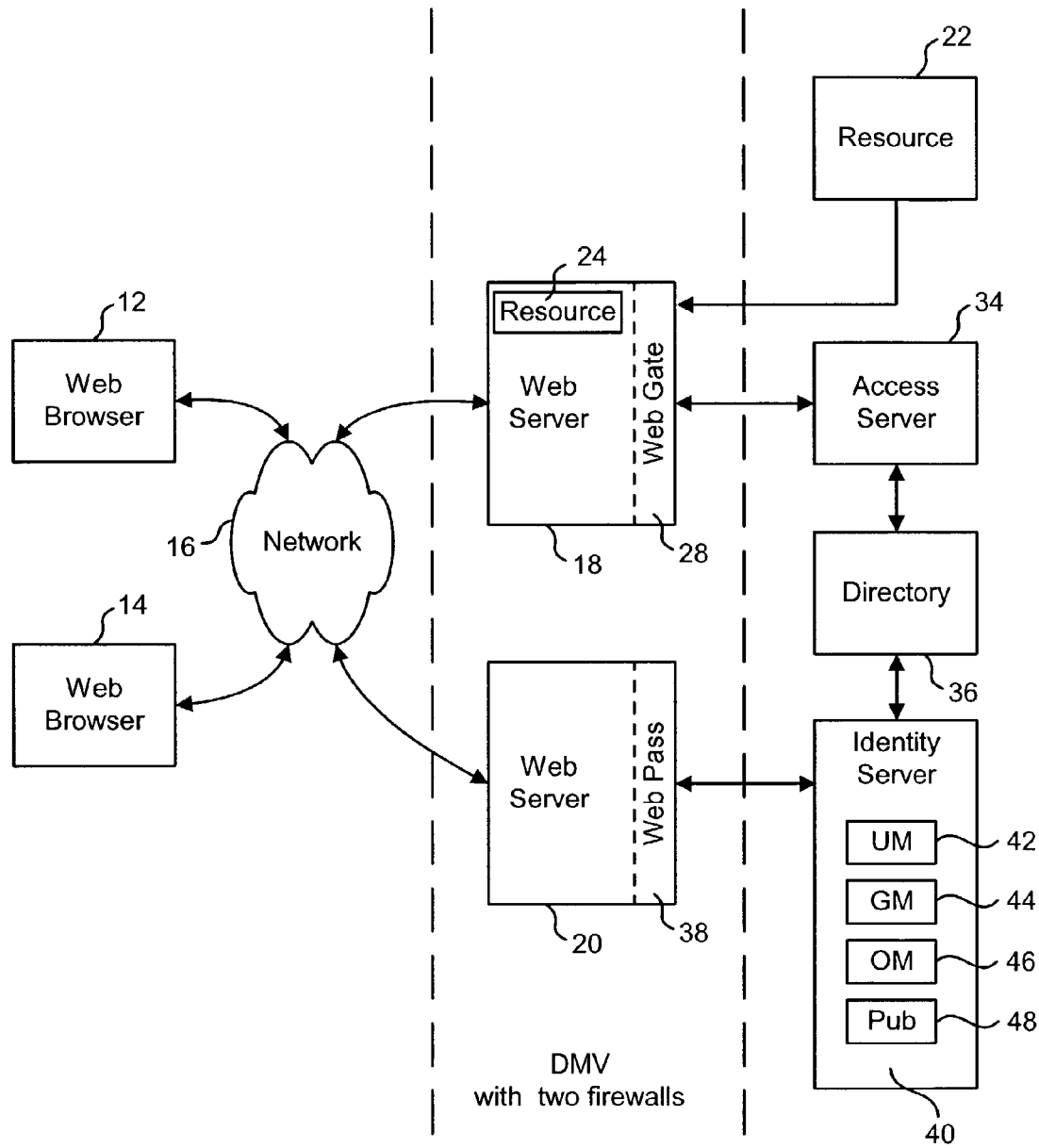
FIG. 1 is a block diagram depicting the components of one embodiment of an Identity System and Access System.

FIG. 1 depicts an example of an access management system that provides identity management services and/or access management services for a network. The identity management portion of the system (referred to as "the Identity System") manages identity profiles, while the access management portion of the system (referred to as "the Access System") provides security for resources across one or more Web Servers (or other components). A key feature of one embodiment of this system is the centralization of the repositories for policies and identity profiles, while decentralizing their administration. That is, one embodiment of the system centralizes the policy and identity repositories by building them on a directory service technology. The system decentralizes their administration by hierarchy delegating administrative roles. Although the system of FIG. 1 includes an Identity System and an Access System, other embodiments may only include an Identity System or only include an Access System.

FIG. 1 is a block diagram depicting one embodiment for deploying an integrated Identity System and Access System. FIG. 1 shows web browsers 12 and 14 accessing Web Server 18 and/or Web Server 20 via network 16. One example of a network is the Internet. In one embodiment, web browsers 12 and 14 are standard web browsers known in the art running on any suitable type of computer. FIG. 1 depicts web browsers 12 and 14 communicating with Web Server 18 and Web Server 20 using HTTP over the Internet; however, other protocols and networks can also be used.

Web Server 18 is a standard Web Server known in the art and provides an end user with access to various resources via network 16. One embodiment includes two firewalls. A first firewall (see dotted lines) is connected between network 16 and Web Server 18. A second firewall (see dotted lines) is connected between Web Servers 16 and 18 and Access Server 34/Identity Server 40.

FIG. 1 shows two types of resources: resource 22 and resource 24. Resource 22 is external to Web Server 18 but can be accessed through Web Server 18. Resource 24 is located on Web Server 18. A resource can be anything that is possible to address with a uniform resource locator (URL, see RFC 1738). A resource can include a web page, software application, file, database, directory, data unit, etc. In one embodiment, a resource is anything accessible to a user via a network. The network could be the Internet, a LAN, a WAN, or any other type of network.

FIG. 1 shows Web Server 18 including Web Gate 28, which is a software module. In one embodiment, Web Gate 28 is a plug-in to Web Server 18. Web Gate 28 communicates with Access Server 34. Access Server 34 communicates with Directory 36.

The Access System includes Access Server 34, Web Gate 28, and Directory 36. Access Server 34 provides authentication, authorization, auditing and logging services. It further provides for identity profiles to be used across multiple domains and for access based on a single web-based authentication (sign-on). Web Gate 28 acts as an interface between Web Server 18 and Access Server 34. Web Gate 28 intercepts requests from users for resources 22 and 24, and authorizes them via Access Server 34. Access Server 34 is able to provide centralized authentication, authorization, and auditing services for resources hosted on or available to Web Server 18 and other Web Servers.

The Identity System includes Web Pass 38, Identity Server 40 and Directory 36. Identity Server 40 manages identity profiles. An identity profile is a set of information associated with a particular entity (e.g. user, group, organization, etc.). The data elements of the identity profile are called attributes. An attribute may include a name, a value and access criteria. The Identity Server includes three main applications, which effectively handle the identity profiles and privileges of the user population: User Manager 42, Group Manager 44, and Organization Manager 46. User Manager 42 manages the identity profiles for individual users. Group Manager 44 manages identity profiles for groups. Organization Manager 46 manages identity profiles for organizations. Identity Server 40 also includes Publisher 48, an application that enables entities to quickly locate and graphically view information stored by Directory 36. In one embodiment, Web Pass 38 is a Web Server plug-in that sends information back and forth between Identity Server 40 and the Web Server 20, creating a three-tier architecture. The Identity System also provides a Certificate Processing Server (not shown in FIG. 1) for managing digital certificates.

User Manager 42 handles the functions related to user identities and access privileges, including creation and deletion of user identity profiles, modification of user identity profile data, determination of access privileges, and credentials management of both passwords and digital certificates. With User Manager 42, the create, delete, and modify functions of user identity management can be set as flexible, multi-step workflows. Each business can customize its own approval, setup, and management processes and have multiple processes for different kinds of users.

Group Manager 44 allows entities to create, delete and manage groups of users who need identical access privileges to a specific resource or set of resources. Managing and controlling privileges for a group of related people—rather than handling their needs individually—yield valuable economies of scale. Group Manager 44 meets a wide range of e-business needs: easy creation, maintenance, and deletion of permanent and ad hoc groups of users who may be allowed or denied access to particular resources; modification and adaptation of groups and their access privileges with minimal disruption to the directory server's underlying schema; efficient addition and deletion of users from established groups; and delegation of administrative responsibility for group membership and subscription requests and approvals.

With Group Manager 44, companies (or other entities) can allow individual users to do the following: (1) self-subscribe to and unsubscribe from groups, (2) view the groups that they are eligible to join or have joined, and (3) request subscription to groups that have access to the applications they need. Multi-step workflows can then define which users must obtain approval before being added to a group and which can be added instantly. Group Manager 44 also lets organizations form dynamic groups specified by an LDAP filter. The ability to create and use dynamic groups is extremely valuable because it eliminates the administrative headache of continually keeping individual, static membership up-to-date. With dynamic group management features, users can be automatically added or removed if they meet the criteria specified by the LDAP filter. Dynamic groups also greatly enhance security since changes in user identities that disqualify someone from membership in a group are automatically reflected in the dynamic group membership.

The third application in the Identity System, Organization Manager 46, streamlines the management of large numbers of organizations within an e-business network, including partners, suppliers, or even major internal organizations such as sales offices and business units. Certain infrastructure security and management operations are best handled—or can only be handled—at the highest organizational unit level rather than at the individual or group level. Like User Manager and Group Manager, this application relies on multi-step workflow and delegation capabilities. Organization Manager handles the following administrative tasks: (1) organization lifecycle management, whereby companies can create, register, and delete organizations in their systems using customizable workflows; (2) maintenance of organization profiles on an attribute-by-attribute basis through self-service, delegated administration and system-initiated activities; (3) organization self-registration, whereby organizations such as business partners, customers and suppliers can self-generate a request to be added to the e-business network; and (4) creation of reusable rules and processes through multi-step workflows.

The various components of FIG. 1 can be implemented by software running on computing devices. Many different types of computing devices can be used, including servers, mainframes, minicomputers, personal computers, mobile computing devices, etc. Typically, such computing devices will have one or more processors that are programmed by code that is stored in one or more processor readable storage devices. The one or more processors are in communication with the processor readable storage devices, peripherals (e.g. keyboards, monitors, pointing devices, printers, etc.) and communication interfaces (e.g. network interfaces, modems, wireless transmitters/receivers, etc.).

The system of FIG. 1 is scalable. There can be many Web Servers, many Access Servers, and many Identity Servers. In one embodiment, Directory 36 is a Directory Server and communicates with other servers/modules using LDAP or LDAP over SSL. In other embodiments, Directory 36 can implement other protocols or can be other types of data repositories (e.g. relational database using SQL, etc.). Many variations of the system of FIG. 1 can be used with the present invention. For example, instead of accessing the system with a web browser, an API can be used. Alternatively, portions of functionality of the system at FIG. 1 can be separated into independent programs that can be accessed with a URL.

To understand how the system of FIG. 1 protects a resource, first consider the operation of unprotected resources. With a typical unprotected resource, end users cause their browsers to send a request to a Web Server. The request is usually an HTTP request, which includes a URL. The Web Server then translates, or maps, the URL into a file system's name space and locates the matching resource. The resource is then returned to the browser.

With the system of FIG. 1 deployed, Web Server 18 (enabled by Web Gate 28, Access Server 34, and Directory 36) can make informed decisions based on default and/or specific rules about whether to return requested resources to an end user. The rules are evaluated based on the end user's identity profile, which is managed by the Identity System. In one embodiment of the present invention, the general method proceeds as follows. An end user enters a URL or an identification of a requested resource residing in a protected policy domain. The user's browser sends the URL as part of an HTTP request to Web Server 18. Web Gate 28 intercepts the request. If the end user has not already been authenticated, Web Gate 28 causes Web Server 18 to issue a challenge to the browser for log-on information.

The received log-on information is passed back to Web Server 18 and on to Web Gate 28. Web Gate 28 in turn makes an authentication request to Access Server 34, which determines whether the user's supplied log-on information is authentic or not. Access Server 34 performs the authentication by accessing attributes of the user's identity profile and the resource's authentication criteria stored on Directory 36. If the user's supplied log-on information satisfies the authentication criteria, the process flows as described below; otherwise, the end user is notified that access to the requested resource is denied and the process halts.

After authenticating the user, Web Gate 28 queries Access Server 34 about whether the user is authorized to access the resource requested. Access Server 34 in turn queries Directory 36 for the appropriate authorization criteria for the requested resource. Access Server 34 retrieves the authorization criteria for the resource and answers Web Gate 28's authorization query, based on the resource's authorization criteria and the user's identity profile. If the user is authorized, the user is granted access to the resource; otherwise, the user's request is denied. Various alternatives to the above described flow are also within the spirit and scope of the present invention.

Authentication and Authorization decisions are based on policy domains and policies. A policy domain is a logical grouping of Web Server host ID's, host names, URL prefixes, and rules. Host names and URL prefixes specify the course-grain portion of the web name space a given policy domain protects. Rules specify the conditions in which access to requested resources is allowed or denied, and to which end users these conditions apply. Policy domains contain two levels of rules: first level default rules and second level rules contained in policies. First level default rules apply to any resource in a policy domain not associated with a policy.

A policy is a grouping of a URL pattern, resource type, operation type (such as a request method), and policy rules. These policy rules are the second level rules described above. Policies are always attached to a policy domain and specify the fine-grain portion of a web name space that a policy protects. In practice, the host names and URL prefixes from the policy's policy domain are logically concatenated with the policy's URL pattern. The resulting overall pattern is compared to the incoming URL. If there is a match, then the policy's various rules are evaluated to determine whether the request should be allowed or denied; if there is not a match, then default policy domain rules are used.

Figure 2:
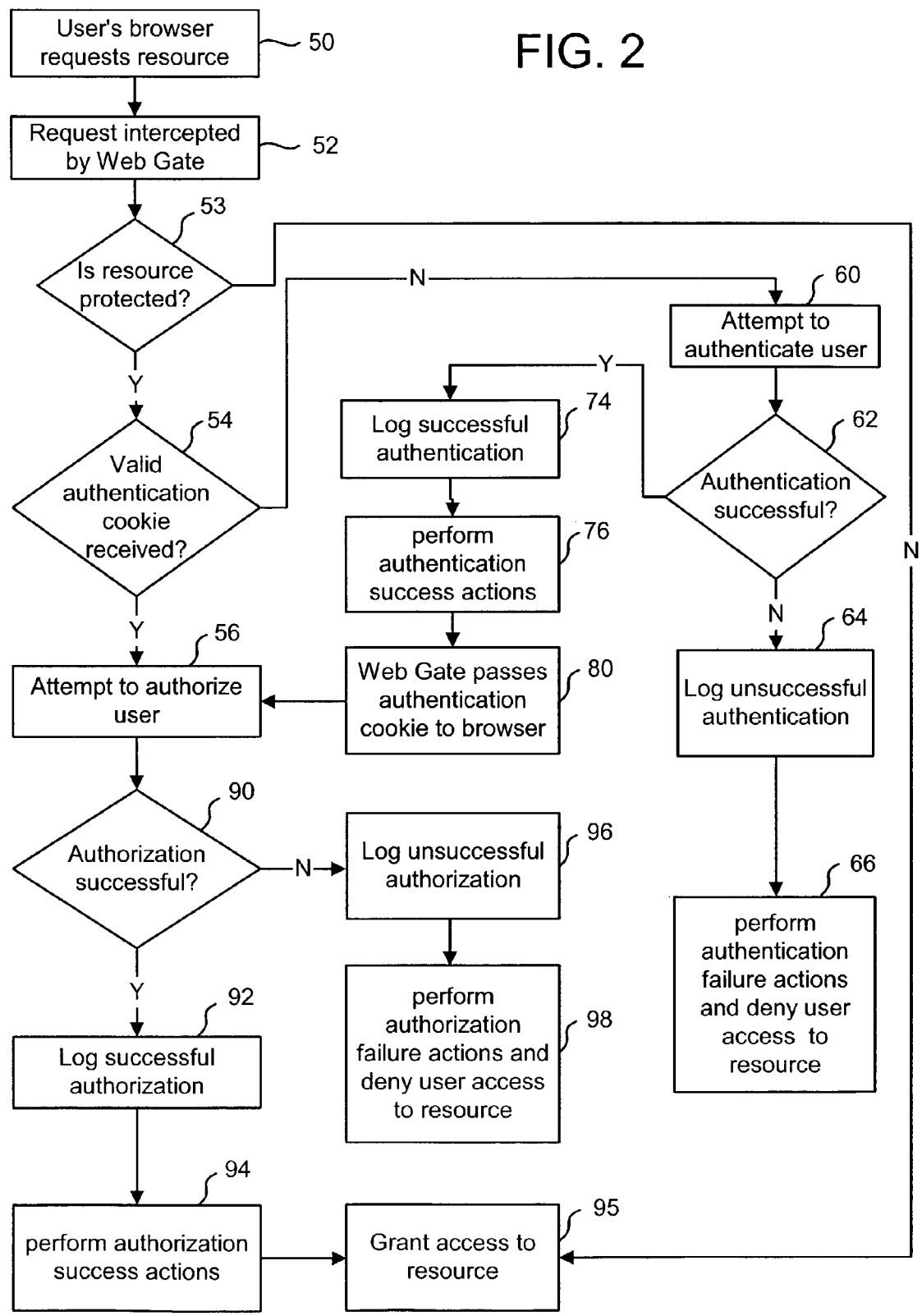
FIG. 2 is a flow chart describing one embodiment of a process for authenticating and authorizing.

FIG. 2 provides a flow chart for one embodiment of a method for authenticating and authorizing. A user's browser 12 requests a web-enabled resource 22 or 24 (step 50). The request is intercepted by Web Gate 28 (step 52). The method then determines whether the requested resource is protected by an authentication and/or authorization rule (step 53). If the resource is not protected, then access is granted to the requested resource (step 95). If the requested resource is protected, however, the method proceeds to step 54. If the user was previously authenticated for a protected resource in the same domain, a valid authentication cookie is passed by browser 12 with the request in step 50. The authentication cookie is intercepted by Web Gate 28 in step 52. If a valid cookie is received (step 54), the method attempts to authorize the user (step 56). If no valid authentication cookie is received (step 54), the method attempts to authenticate the user for the requested resource (step 60).

If the user successfully authenticates for the requested resource (step 62), then the method proceeds to step 74. Otherwise, the unsuccessful authentication is logged (step 64). After step 64, the system performs authentication failure actions and Web Gate 28 denies the user access to the requested resource (step 66). In step 74, the successful authentication of the user for the resource is logged. The method then performs authentication success actions (step 76). In response to the successful authentication, Web Gate 28 then passes a valid authentication cookie to browser 12 (step 80), which stores the cookie. After passing the cookie in step 80, the system attempts to authorize (step 56).

In step 56, the method determines whether the user is authorized to access the requested resource. If the user is authorized (step 90), the method proceeds to step 92. Otherwise, the unsuccessful authorization is logged (step 96). After step 96, the method performs authorization failure actions (step 98) and Web Gate 28 denies the user access to the requested resource. If authorization is successful (step 90), then the successful authorization of the user is logged (step 92). Authorization success actions are performed in step 94. The user is granted access to the requested resource (step 95). In one embodiment of step 95, some or all of HTTP request information is provided to the resource. In one or more scenarios, the resource being accessed is the Identity System.

More information about authorization, authentication, an Access System and an Identity System can be found in U.S. patent application Ser. No. 09/999,074, "Workflows With Associated Processes," filed on Nov. 30, 2001, which is incorporated herein by reference in its entirety.

Both the Identity System and the Access System make use of Directory 36. The basic unit of information store in Directory 36 is called an entry or identity profile, which is a collection of information about an object. The information in an entry often describes a real-world object such as a person, but this is not required. A typical directory includes many entries that correspond to people, departments, groups and other objects in the organization served by the directory. An entry is composed of a set of attributes, each of which describes one particular trait of the object. Each attribute has a type, one or more values, and associated access criteria. The type describes the kind of information contained in the attribute, and the value contains the actual data.

An entry in the directory has a set of attributes that are required and a set of attributes that are allowed. For example, an entry describing a person is required to have a cn (common name) attribute and an sn (surname) attribute. One example of an allowed attribute may be a nickname. Any attribute not explicitly required or allowed is prohibited.

Examples of attributes stored in a user identity profile include: first name, middle name, last name, title, email address, telephone number, fax number, mobile telephone number, pager number, pager email address, identification of work facility, building number, floor number, mailing address, room number, mail stop, manager, direct reports, administrator, organization that the user works for, department number, department URL, skills, projects currently working on, past projects, home telephone, home address, birthday, previous employers and anything else desired to be stored by an administrator. Examples of attributes stored in a group identity profile include: owner, name, description, static members, dynamic member rule, subscription policies, etc. Examples of attributes stored in a user organization identity profile include: owner, name, description, business category, address, country, etc. In other embodiments, less or more than the above-listed information is stored.

Figure 3:
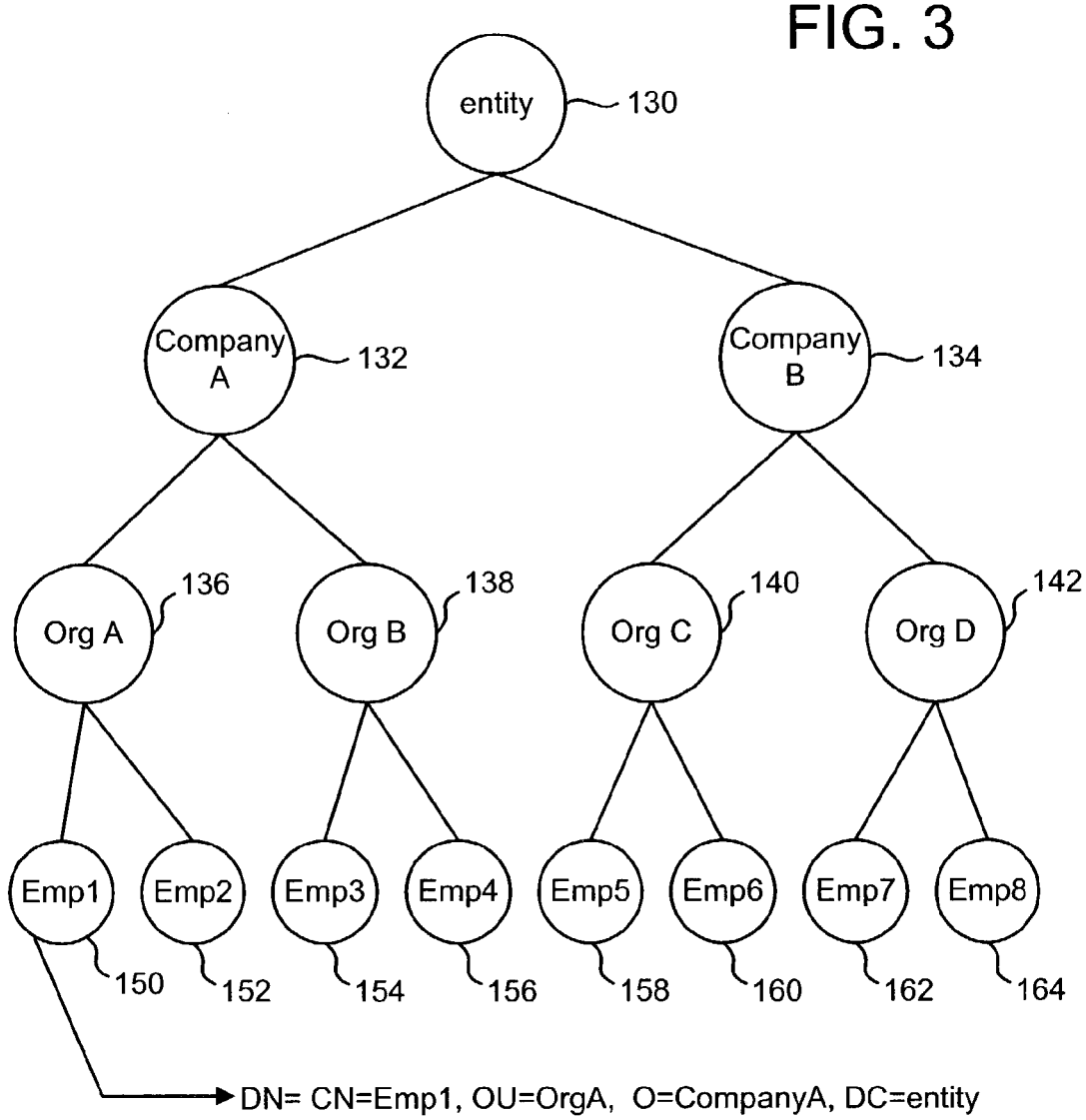
FIG. 3 is an example of a directory tree structure.

FIG. 3 depicts an exemplar directory tree that can be stored in Directory 36. Each node on the tree is an entry in the directory structure that includes an identity profile. In one embodiment, the entity can be a user, group or organization. Node 230 is the highest node on the tree and represents an entity responsible for the directory structure. In one example, an entity may set up an Extranet and grant Extranet access to many different companies. The entity setting up the Extranet is node 130. Each of the companies with Extranet access would have a node at a level below node 130. For example, company A (node 132) and company B (node 134) are directly below node 130. Each company may be broken up into organizations. The organizations could be departments in the company or logical groups to help manage the users. For example, FIG. 3 shows company A broken up into two organizations: organization A with node 136 and organization B with node 138. Company B is shown to be broken up into two organizations: organization C with node 140 and organization D with node 142. FIG. 3 shows organization A having two end users: employee 1 with node 150 and employee 2 with node 152. Organization B is shown with two end users: employee 3 with node 154 and employee 4 with node 156. Organization C is shown with two end users: employee 5 with node 158 and employee 6 with node 160. Organization D is shown with two end users: employee 7 with node 162 and employee 8 with node 164.

Each entity has a distinguished name (DN), which uniquely identifies the node. In one embodiment, each entry also has a relative name, which is different from all other relative names on the same level of the hierarchy. In one implementation, the distinguished name (DN) comprises a union of the relative names up the tree. For example, the distinguished name of employee 1 (node 150) is DN=CN=Empl, OU=OrgA, O=CompanyA,
DC=entity, where:

| | |
|---|---|
| DC = | Domain Component |
| O = | Organization |
| OU = | Organizational Unit |
| CN = | common name. |

FIG. 3 shows a hierarchical tree. Some organizations employ fat or flat trees for ease of maintenance. A flat directory tree is a directory information tree that does not have any hierarchy. All of the nodes are leaf nodes (nodes without any child nodes). A fat directory tree is a tree that has a large number of nodes at any given level in a directory information tree. One advantage of a fat or flat tree is user maintenance. For example, if an employee moves to a new group, the node must be moved to a new container if the tree is not flat or fat. By moving the node to a new container, the distinguished name for the node changes and all certificates become void. One drawback of flat or fat trees is that the organization loses the benefits of having a logical directory, such as using the logical directory to determine who has access to which nodes. To remedy this, the Identity System includes partition support for fat and flat tree directories using filters. From a configuration page, an attribute can be configured to be accessible (read, modify, etc.,) based on a two part filter. The first component in the filter identifies a top node in the directory. The filter will only apply to those entities at or below that top node. The second component of the filter is an LDAP filter which defines who can access the attribute. This two component filter can be applied on an attribute by attribute basis.

There are many ways for an entity to access and use the Identity System. In one embodiment, the entity can access the Identity System's services using a browser. In other embodiments, XML documents and API's can be used to access the services of the Identity System. For example, an entity can use a browser by pointing the browser to Identity Server 40. The user will then be provided with a login page to enter the user's ID, password, type of user and application requested (optional). Upon filling out that information, the user will be authenticated and authorized (by the Access System) to use the Identity System. Alternatively, the Access System can be bypassed (or there may be no Access System) and the Identity System authenticates the user.

As described above, the Identity System of FIG. 1 includes User Manager 42, Group Manager 44 and Organization Manager 46. User Manager 42 manages identity profiles for users. Group Manager 44 manages identity profiles for groups. Organization Manager 46 manages identity profiles for organizations. Each of these components will now be described in more detail.

Figure 4:
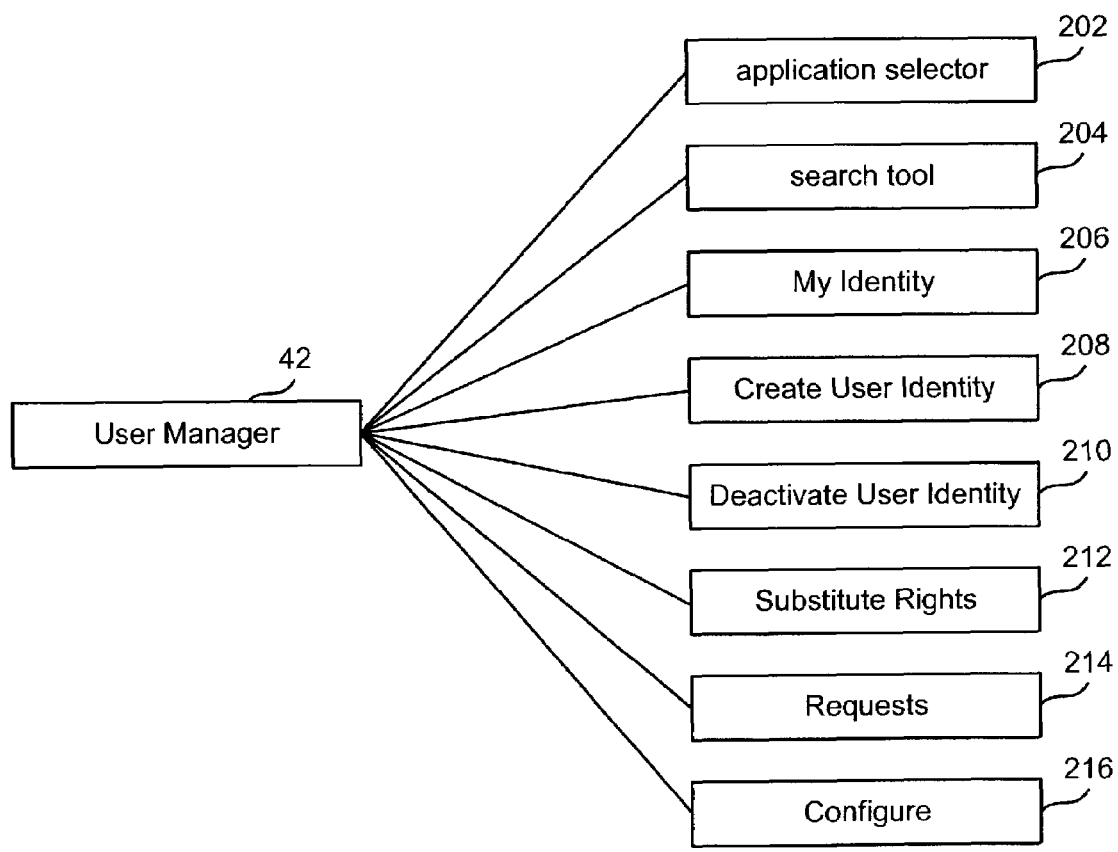
FIG. 4 is a block diagram depicting the User Manager.

FIG. 4 graphically depicts the various services provided by User Manager 42. Each of these services can be accessed from a User Manager home page. For example, in one embodiment, the home page will include application selector 202, search tool 204, My Identity tab 206, Create User Identity tab 208, Deactivate User Identity tab 210, Substitute Rights tab 212, Requests tab 214 and Configure tab 216. Application selector 202 lets the user change applications from the User Manager to either the Group Manager, Object Manager or Publisher. In one embodiment, application selector 202 is a drop down menu. Search tool 204 enables a user to provide search information in order to search the directory for a set of one or more user identity profiles.

By selecting My Identity tab 206, a user is provided with the information stored in that user's identity profile. Create User Identity tab 208 allows a user with the appropriate privileges to create a new user identity profile (e.g. with a workflow). Deactivate User Identity tab 210 allows a user with proper privileges to remove an identity profile from the directory. Substitute Rights tab 212 allows the user to indicate who can proxy that user and allows the user to be a proxy for someone else. Request tab 214 allows a user to monitor workflows that are in progress or recently completed. Depending on the user's privileges, by selecting request tab 214, the user can see all workflows that involve that user, that are started by that user, that affect that user or that the user has privileges to view. Request tab 214 will indicate workflows for which there is an outstanding action to be done by the current user. The user can select that workflow and perform the task.

Configure tab 216 allows a user to configure various options for User Manger 42. The user must have sufficient privileges to access Configure tab 216. The user can perform attribute access control, delegate administration, define workflows and set the search base. Attribute access control includes controlling who has view and modify permissions for each attribute. Attributes can be set at any and all levels in an organization. The configuration also allows the specification of an e-mail notification list when a change to an attribute is requested. Delegation administration includes delegating administrative tasks to local administrators. An entity can choose what rights to delegate, whom to delegate to, and the scope to delegate. Workflow definition includes defining workflows for a particular organization, defining who will be responsible for the workflow actions and/or defining who will be receiving notifications for the workflow actions. Setting the search base includes setting the search base for a particular organization, person or set of persons. This will localize access to ensure security.

FIG. 5 depicts the various services provided by Group Manager 44. Once an entity is at the Group Manager home page, the entity can access application selector 230, search tool 232, My Groups tab 234, Create Groups tab 236, Request tab 238, Manage Subscriptions tab 239, Configure tab 240, and Manage Members tab 241. My Groups tab 234 indicates the groups of which the entity is a member. By selecting any of the groups identified by My Groups tab 234 or Search Tool 232, the user will be provided with the identity profile page for that particular group. From the profile page, the group can be modified or deleted. Create groups tab 236 allows the user to create a new group. Request tab 238 provides the user with access to currently pending and recently finished workflows that involve groups. Configure tab 240 allows the user to configure various information about groups in the Group Manager. While viewing the identity profile for a group, the entity can modify that profile if the entity has appropriate privileges.

Configure tab 240 allows an entity to provide attribute access control, delegate rights, define workflows and expand dynamic groups. Attribute access control includes controlling who has view and modify permissions for each attribute in group identity profiles. Additionally, e-mail notification lists can be created which are used to notify entities when a change to an attribute is requested. Administration tasks can be delegated to local administrators. An entity can choose what rights to delegate, who to delegate to, and what the scope of the delegation is. Workflow definition includes defining the workflows for a particular group. This includes defining who is responsible for the workflow actions and who will be receiving notifications for workflow actions. Note that some of the tabs and services may not be available to all entities, depending upon the privileges of those entities. Manage Subscriptions tab 239 allows users to subscribe to groups or unsubscribe from groups. Manage Members tab 241 allows users to view, add, remove, and search members of a group.

FIG. 6 depicts the services provided by Organization Manager 46. Organization manager 46 provides functionality to create, modify, delete and manage organizational objects. From the home page for Organization Manager 46, a user is provided with application selector 242, search tool 244, Create Organizational Profile tab 246, Request tab 248 and Configure tab 250. Application selector 242 allows the user to select a different application to access. Search tool 244 provides a user with the ability to enter search terms in order to search for one or more organizational objects. After performing a search, the user will be provided with a list of organizational objects meeting the search requirements. User can select any of these objects to view, modify or delete, if the user has sufficient privileges.

Create Organizational Profile tab 246 allows a user to create new organizational objects, if the user has sufficient privileges. Request tab 248 allows a user to access pending workflows and workflows that have recently been finished that relate to organizational objects. Access to Request tab 248 can be restricted and/or limited depending upon users privileges. If a user has a step to perform for a workflow, it will be indicated by Request tab 248.

Configure tab 250 allows the entity to perform attribute access control, delegate administration, define workflows and define container limits. Attribute access control includes controlling who has view and modify permissions for each attribute of an organizational identity profile. In addition, an entity can specify an e-mail notification list when a change to an attribute is requested. Delegating administration includes delegating administrative tasks to local administrators. An entity can choose what rights to delegate, whom to delegate to, and the scope of the delegation. Workflow definition includes defining the workflows for a particular organization, including who will be responsible for the workflow actions and who will be receiving notifications for the workflow. Container limits includes controlling how many objects can be created in an organization. This would also include defining who will be receiving notifications that a container limit has been met, has been violated or is close to being met.

In some instances, users access Identity Systems, Access Systems, and integrated Identity/Access System through a portal. For example, an organization employing the integrated Identity/Access System may have a primary website that employees use to access resources available on a network. The organization's website includes portals for accessing network resources, such as applications and resources on the Identity/Access System. Example networks include the Internet, an intranet, an extranet, a local area network, and a wide area network.

A portal traditionally provides a window into a single network resource, such as User Manager 42, Group Manager 44, or Organization Manager 46—requiring the use of multiple portals to access the various applications in the Identity System. A Portal Bridge in accordance with the present invention can be employed to facilitate communication with multiple network resources though a single portal.

Figure 7:
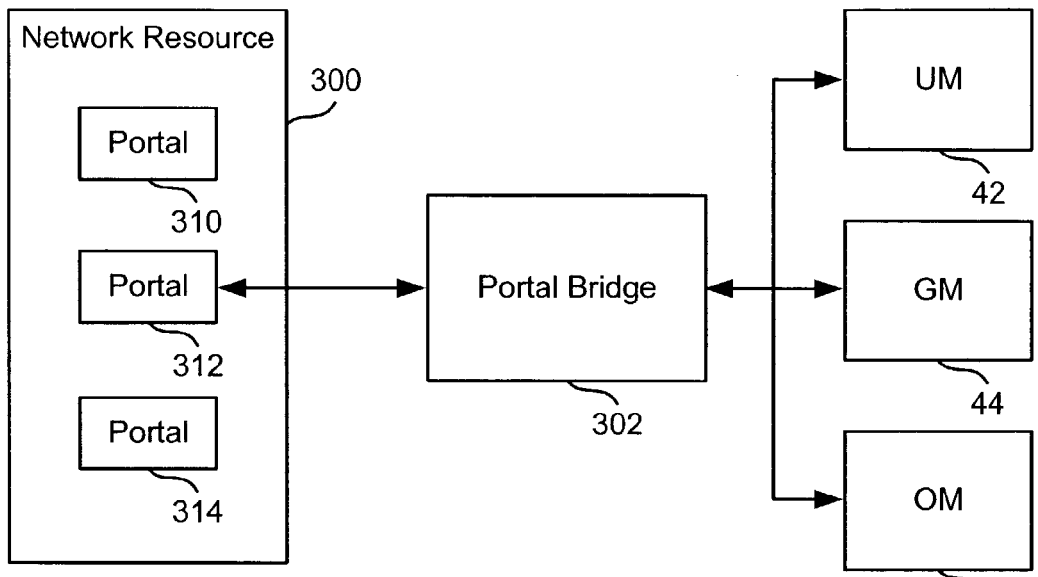
FIG. 7 is a block diagram depicting one implementation of a Portal Bridge in accordance with the present invention.

FIG. 7 is a block diagram depicting one implementation of a Portal Bridge in accordance with the present invention. Network resource 300 includes multiple portals 310, 312 and 314. In one implementation, network resource 300 is an organization's website or a resource on the organization's intranet. Each portal is able to send requests to a network resource. In one implementation, portals send requests in the form a URL using the Hypertext Transport Protocol ("HTTP"). In alternate implementations, portals employ different protocols for issuing requests. In practice, a portal can be all or a portion of one network resource with the capability to address another network resource.

Portal Bridge 302 receives requests from portal 312 and provisions them out to other network resources to obtain responses for portal 312. In alternate embodiments, Portal Bridge 302 is coupled to something other than a portal. Portal Bridge 302 can receive requests from any type of network resource, regardless of whether the resource employs portals.

FIG. 7 shows Portal Bridge 302 in communication with applications in the Identity System. Portal Bridge 302 directs requests to User Manager 42, Group Manager 44 and Organization Manager 46, in response to requests from portal 312. Portal Bridge 302 examines incoming requests from portal 312 and identifies the network resource to use in servicing the portal's request. In some instances, Portal Bridge 302 may need to forward requests to more than one network resource in response a single request from portal 312.

In response to a request from Portal Bridge 302, a targeted network resource provides a response. For example, Portal Bridge 302 may issue a request to User Manager 304, Group Manager 306 or Organization Manager 308 in order to service a request from portal 312. User Manager 304, Group Manager 306 or Organization Manager 308 returns a response to the request from Portal Bridge 302. Portal Bridge 302 receives the response and processes it for delivery to portal 312. Portal Bridge 302 then forwards the processed response to portal 312—completing the service of the original request from portal 312.

In one implementation, Portal Bridge 302 resides inside the Identity System, Access System, or integrated Identity/Access System. In an alternate implementation, Portal Bridge 302 does not reside inside of the Identity System, Access System, or integrated Identity/Access System. In even further implementations, Portal Bridge 302 can be a client application within network resource 300.

Portal Bridge 302 can be implemented by software running on one or more computing devices. Many different types of computing devices can be used, including servers, mainframes, minicomputers, personal computers, mobile computing devices, etc. Typically, such computing devices will have one or more processors that are programmed by code that is stored in one or more processor readable storage devices. The one or more processors are in communication with the processor readable storage devices, peripherals (e.g. keyboards, monitors, pointing devices, printers, etc.) and communication interfaces (e.g. network interfaces, modems, wireless transmitters/receivers, etc.).

Figure 8:
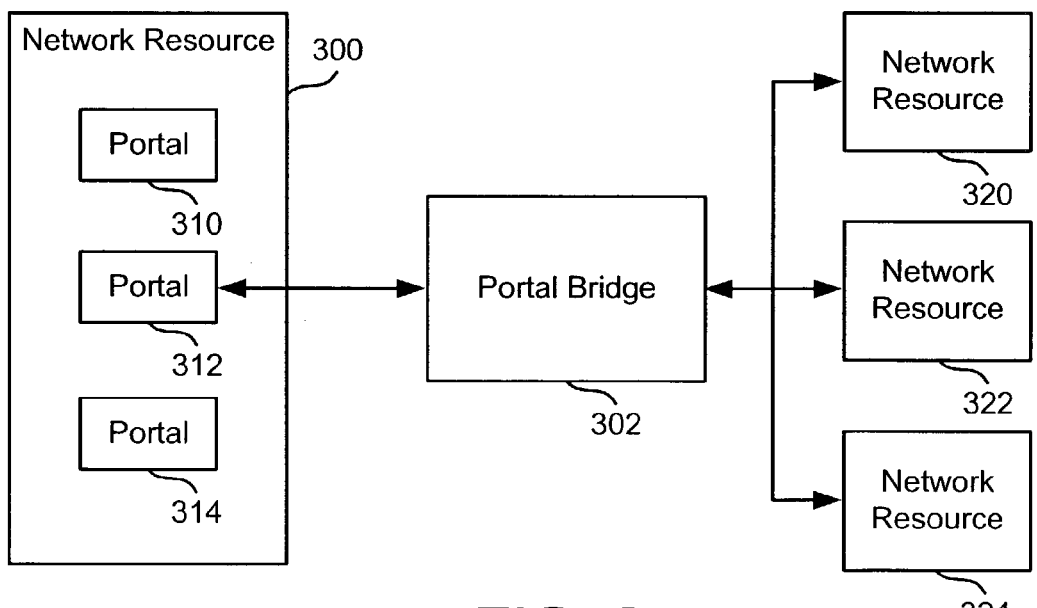
FIG. 8 is a block diagram depicting another implementation of a Portal Bridge in accordance with the present invention.

User Manager 304, Group Manager 306, and Organization Manager 308 are only examples of network resources. FIG. 8 is a block depicting another implementation of Portal Bridge 302 operating with different network resources. The components in FIG. 8 with the same numbers as those shown above in FIG. 7 operate the same as described for FIG. 7. In FIG. 8, User Manager 42, Group Manager 44, and Organization Manager 46 are replaced by network resources 320, 322, and 324, respectively. FIG. 8 shows that Portal Bridge 302 is capable of interfacing with any type of network resources, regardless of whether the resources are related to Identity Systems or Access Systems. Examples of network resource 320, 322, and 324 include financial websites, geography mapping websites, and sports related websites.

Network resource 300 can also be implemented using a wide variety of different entities in various embodiments of the present invention. In one example, network resource 300 is a person's website. In another example, network resource 300 is the website homepage for a corporation or the corporation's intranet. Although FIGS. 7 and 8 show Portal Bridge 302 connected to three (3) network resources (42, 44, and 46 in FIG. 7 and 320, 322, and 324 in FIG. 8) Portal Bridge 302 can communicate with more or less network resources in various embodiments of the present invention.

Figure 9:
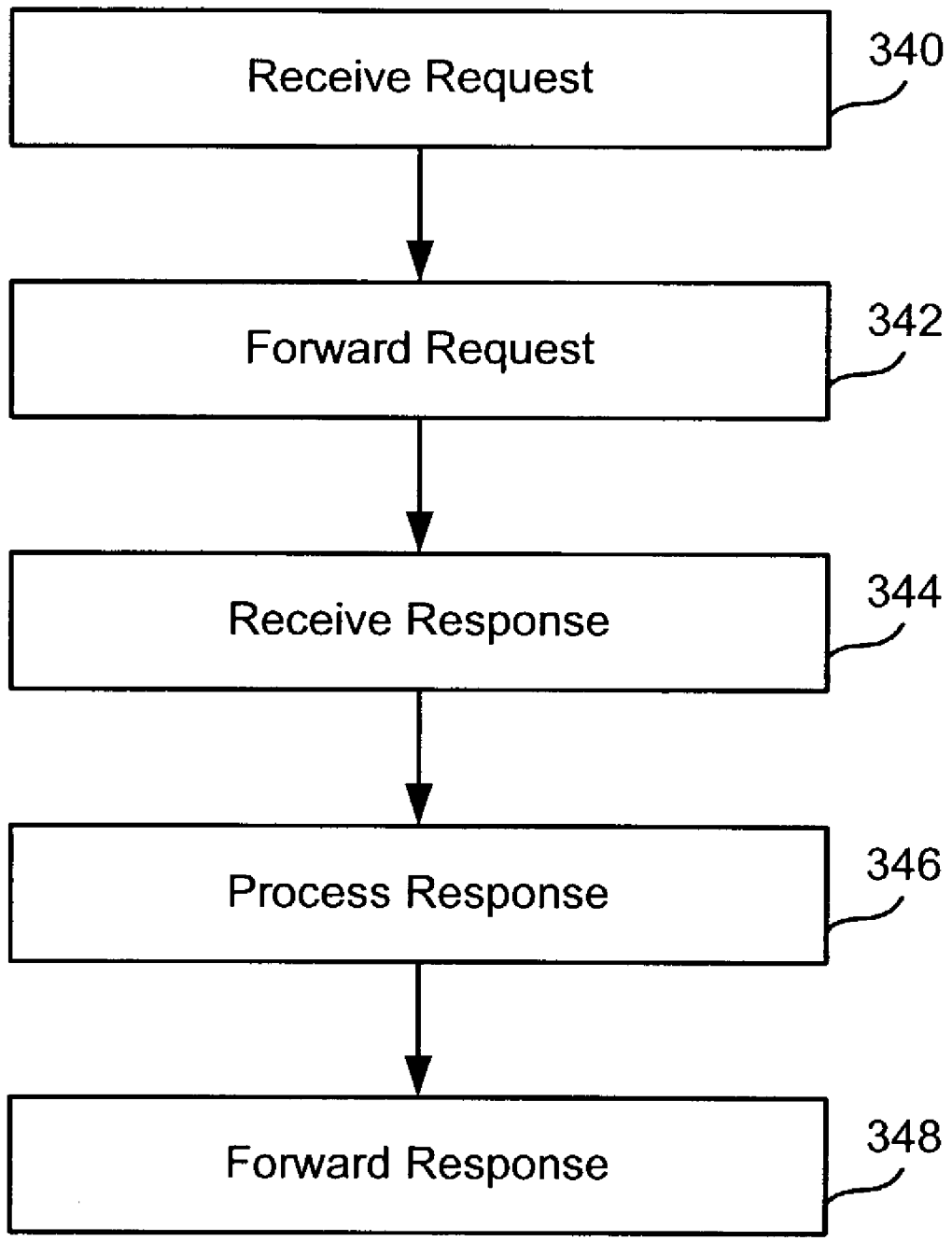
FIG. 9 is a flowchart depicting one embodiment of a process performed by a Portal Bridge.

FIG. 9 is a flowchart depicting one embodiment of a process performed by Portal Bridge 302 to service portal requests. Portal Bridge 302 receives a request from portal 312 in network resource 300 (step 340). The request identifies Portal Bridge 312 as the destination and includes one or more parameters that inform Portal Bridge 302 of the response desired by portal 312. One example of a request from portal 312 is shown below:
    http://bridge/cgi-bin/
        bridgeapp.cgi?param1=param1value&param2=param2value The above example is a URL in the HTTP protocol. In alternate embodiments, different request formats can be employed. For the request show above, the various fields have the following significance: 1) bridge—identifying Portal Bridge 302 as the destination for the request; 2) cgi-bin—indicating that a common gateway interface ("cgi") application will be implemented by Portal Bridge 302 to service the request; 3) bridgeapp.cgi—identifying the cgi application Portal Bridge 302 will perform to service the request; 4) ?—signifying that the following fields identify parameters for the application identified in the bridgeapp.cgi field; 5) param1=param1value—identifying a parameter (param1) and the corresponding value for the parameter (param1value); 6) param2=param2value—identifying a second parameter (param2) and its corresponding value (param2value). In various embodiments, any number of different parameters may be employed. Two parameters are shown here only for example purposes. In one implementation, the application identified by bridgeapp.cgi performs all or a portion of the process steps shown in FIG. 9.

In one embodiment, portal 312 is initialized to issue a first request that addresses Portal Bridge 312. This initiates communication between portal 312 and Portal Bridge 302. In one implementation, the initial request from portal 312 does not need to include any parameters. In one example, Portal Bridge 302 provides one or more navigation interfaces to portal 312 in response to the first request.

The following provides example parameters that can be employed in the above-identified request from portal 312 in various embodiments of the present invention: 1) request—identifying at least a portion of a request to be issued by Portal Bridge 302 in response to the request from portal 312, so that the portal's request can be serviced; 2) format—identifying a desired format for the response that Portal Bridge 302 will provide to portal 312; 3) aggregate—indicating whether the response to the request from portal 312 will be formed by the aggregation of multiple responses from one or more network resources. When a request from portal 312 provides no parameter, Portal Bridge 302 performs a default action in one embodiment, such as providing a navigation interface.

In one implementation, the value for the request parameter is in the form of a full or partial URL. Portal Bridge 302 forwards the parameter value to the network resource that Portal Bridge 302 employs to obtain responses for portal 312. For example, a request parameter sent to Portal Bridge 302 in FIG. 7 can have a value that corresponds to a request that Portal Bridge 302 needs to issue to User Manager 42, Group Manager 44, or Organization Manager 46. In further embodiments, the request parameter points to, or otherwise identifies, a full or partial URL for a request that Portal Bridge 302 needs to issue to a network resource. Example values for the format parameter include XML and HTML. Portal Bridge 302 will respond by ensuring that responses sent to portal 312 conform to the specified format. The above parameter values are only examples. Other parameter values can be employed in various embodiments of the present invention. Greater details regarding the processing of parameters by Portal Bridge 302 are provided below.

Portal Bridge 302 forwards requests to one or more of the network resources identified in the request parameters in the request from portal 312 (step 342, FIG. 9). More details are provided below regarding the forwarding of requests to targeted network resources. Portal Bridge 302 receives one or more responses to the requests issued to network resources in step 342 (step 344). Portal Bridge 302 processes the responses received in step 344 (step 346) and forwards the processed response to portal 312 (step 348). In one implementation, Portal Bridge 302 processes the responses from the targeted network resources by placing them in a format that is desired by portal 312 and replacing any links that address a network resource other than Portal Bridge 302. This processing enables Portal Bridge 302 to serve as a single channel for connecting portal 312 with multiple network resources. Greater details regarding the processing of responses is provided below.

Figures 10, 11:
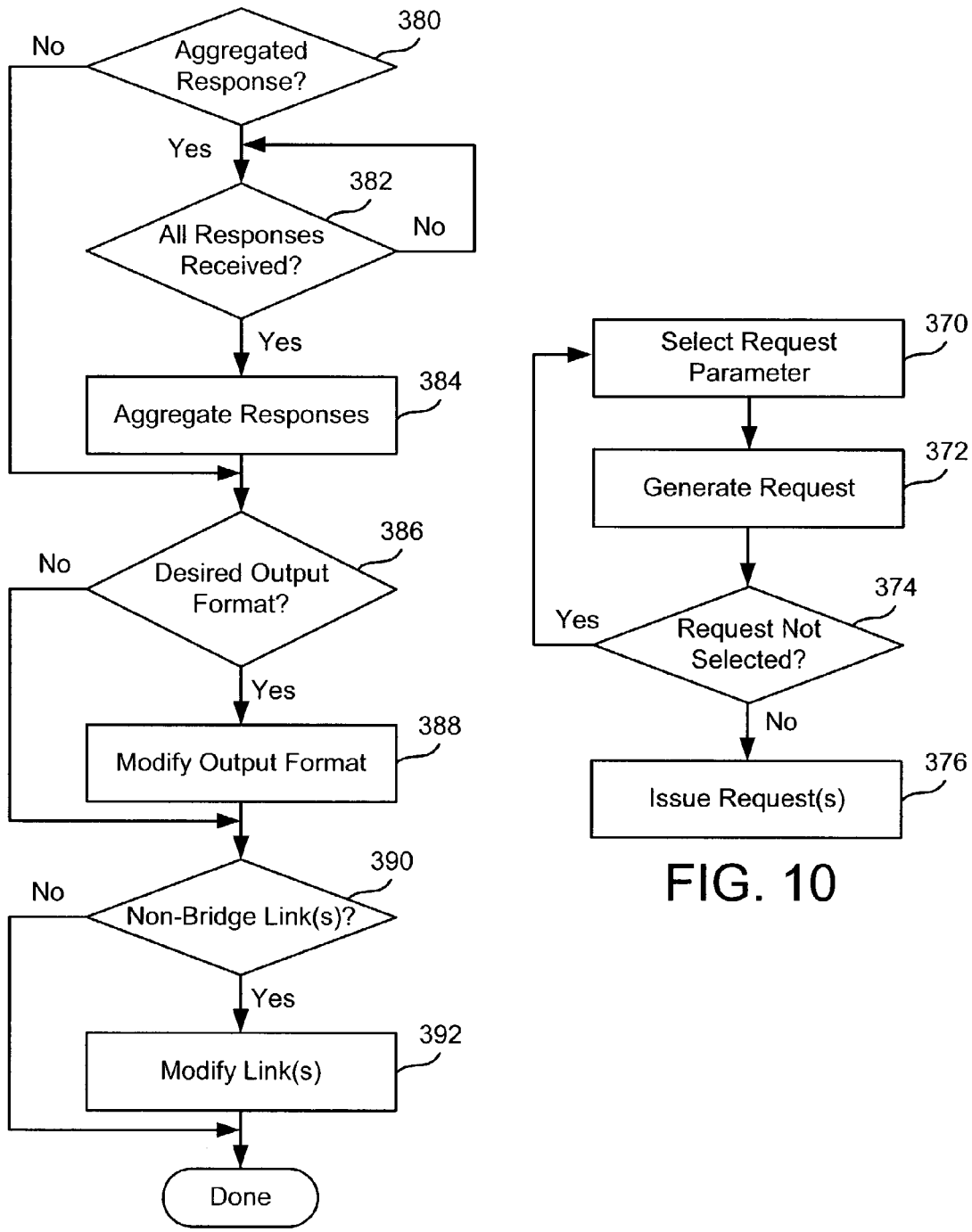
FIG. 10 is a flowchart depicting one embodiment of a process for a Portal Bridge to forward requests.
FIG. 11 is a flowchart depicting one embodiment of a process for a Portal Bridge to process responses.

FIG. 10 is a flowchart depicting one embodiment of a process for Portal Bridge 302 to forward requests (step 342, FIG. 9). The process shown in FIG. 10 accounts for one or more request parameters appearing in the request that Portal Bridge 302 receives from portal 312 (step 340, FIG. 9). Portal Bridge 302 selects a request parameter from an incoming request from portal 312 (step 370). Portal Bridge 302 generates a request to a network resource identified in the selected request parameter value (step 372).

In one embodiment, the request parameter value is a full or partial URL addressed to a network resource. The request generated in step 372 employs the URL in a HTTP request to the same network resource. Alternatively, the selected request parameter only includes information for use in the fields of a URL issued by Portal Bridge 302. In alternate embodiments, different request protocols can be employed. The request generated by Portal Bridge 302 in step 372 also identifies any operations called for in the selected request parameter. Greater details regarding the request generated in step 372 are provided below.

Portal Bridge 302 determines whether any of the request parameters in the request from portal 312 have not been selected (step 374). If any request parameters remain unselected, Portal Bridge 302 returns to step 370 and selects another request parameter. Otherwise, Portal Bridge 302 issues all of the requests generated in the above-identified process to targeted network resources (step 376). In alternate embodiments, Portal Bridge 302 issues each network request immediately after it is generated in step 372.

FIG. 11 is a flowchart depicting one embodiment of a process for Portal Bridge 302 to process responses from network resources (step 346, FIG. 9). The process shown in FIG. 11 provides for Portal Bridge 302 to aggregate responses from network resources, place responses into desired formats, and modify any links in the response. Portal Bridge 302 can employ different processing in further embodiments.

Portal Bridge 302 determines whether to aggregate multiple responses from one or more network resources when responding to a request from portal 312 (step 380). In one implementation, Portal Bridge 302 examines the aggregation parameter in the request from portal 312 to determine whether to aggregate responses. If responses are to be aggregated, Portal Bridge 302 waits to receive all responses from each network resource request issued in step 376 (step 382). Once all of the network resource responses have been received (step 344, FIG. 9), Portal Bridge 302 aggregates the responses (step 384). In one implementation, the aggregation of responses combines the response from each network resource into a single response for portal 312.

Once the responses are aggregated, or if aggregation is not required, Portal Bridge 302 determines whether the response is in the format desired by portal 312 (step 386). In one implementation, Portal 302 compares the current response format with the format specified in the format parameter value of the original request from portal 312. If the format is not correct, Portal Bridge 302 modifies the response to conform with the desired format (step 388). In one implementation, Portal Bridge 302 supports HTML, Extensible HTML, and XML formats. In further implementation, more or less formats are supported by Portal Bridge 302. In one example, network resources (42, 44, 46, 320, 322, 324) provide responses in an XML format. Portal Bridge 302 determines whether portal 312 wants a response in HTML or XML format. If HTML is desired, Portal Bridge 302 puts the response in HTML format. Otherwise, the XML response is sent to portal 312. In one embodiment, Portal Bridge 302 employs XSL style sheets to place the response in the desired format. The XSL style sheets can be maintained by Portal Bridge 302 or provided by the network resource. More details regarding response formatting are provided below.

Once the response is in the desired format, Portal Bridge 302 determines whether any links in the response identify entities other than Portal Bridge 302 (step 390), such as network resources 42, 44, 46, 320, 322 and 324. The links employed within a response from a network resource trigger the issuance of a request to the network resource. The links can be embedded in the form of a URL and associated with a selection device, such as a button display. If a user of network resource 300 were to select one of these links using portal 312, the request generated by the link would not be directed to Portal Bridge 302. The request would be directed to the network resource—causing Portal Bridge 302 to be eliminated from the communication path. In order to avoid this breakdown, Portal Bridge 302 modifies the links (step 392), so that the requests they trigger are directed to Portal Bridge 302. As a result, Portal Bridge 302 receives the link-related requests and forwards corresponding requests to the proper network resource, as described above (steps 340 and 342 in FIG. 9).

In one implementation, Portal Bridge 302 modifies the link within a request to have the request format described above (http://bridge/cgi-bin/bridgeapp.cgi?request1=value for request 1). Portal Bridge 302 inserts all or a portion of the original link as the value for request 1. This enables Portal Bridge 302 to generate a request in response to the link when the link is triggered. Portal Bridge 302 forwards the newly generated request to the network resource identified in the original link and calls for the same operation to be performed as specified in the original link.

The steps shown in FIG. 11 are only one embodiment of processing a response from a network resource. Different embodiments can employ different steps. Additionally, the steps described above may be performed in a different order than that shown in FIG. 11 in various embodiments of the present invention.

The system of FIG. 1 operates as a network resource that provides users with a variety of interface options. For example, the system supports users with traditional browsers by providing for communication using HTTP and HTML. The system also supports interfaces to third party applications, proprietary browsers and others by providing for communication using XML. The system provides further flexibility by facilitating the use of custom XML templates to generate HTML and XML responses. The system's interface capabilities also facilitate communication with Portal Bridge 302. Portal Bridge 302 provides similar interface flexibility by modifying the formats of responses from network resources (step 388, FIG. 11).

Figure 12:
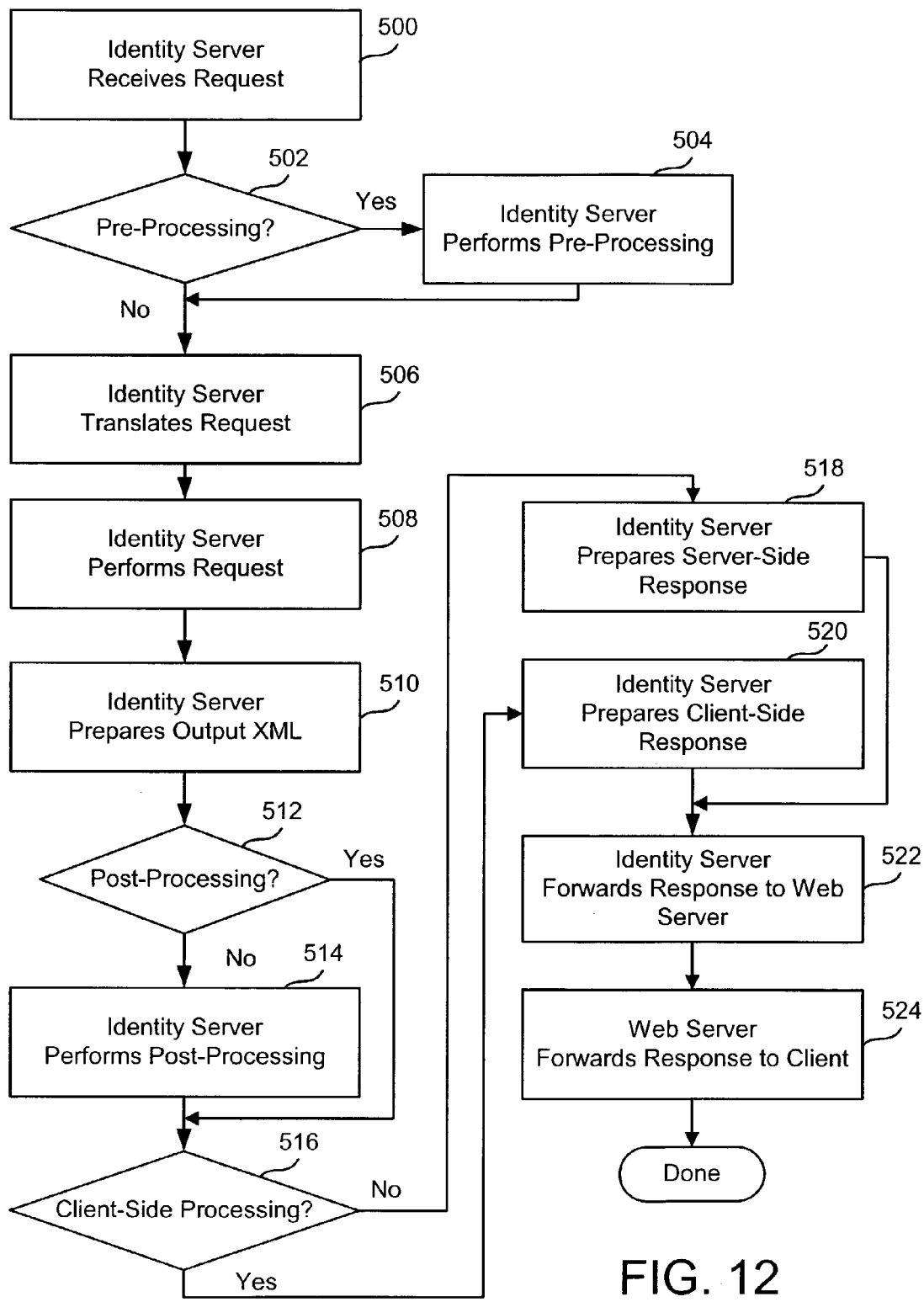
FIG. 12 is a flowchart describing a process for responding to a request.

FIG. 12 shows a process employed by Identity Server 40 to provide responses to users' requests. This process can be implemented by, or in conjunction with, User Manager 42, Group Manager 44, and Organization Manager 46 in responding to requests from Portal Bridge 302. Identity Server 40 receives the request from Web Server 20 (step 500). In one embodiment of the present invention, Identity Server 40 is capable of receiving HTML requests via the HTTP protocol, as well as XML requests via the SOAP protocol (or other protocols). One example of an HTML request over HTTP (or other protocols), appears as follows:

http://host:port/
appname.cgi?param1=value1&param2=val2 . . .

This example request format is employed by Portal Bridge 302 when forwarding requests (step 342, FIG. 9) and generating requests (step 372, FIG. 10) in one embodiment. The request parameter value in a request from portal 312 to Portal Bridge 302 includes all or a portion of a URL with the same format in one implementation. The "http" indicates the request is controlled by the HTTP protocol. The host:port field identifies the host that is the target of the request and port on that host—identifying a network resource in one example. For example purposes, Identity Server 40 will be used below as the network resource that performs the steps in FIG. 12 in response to receiving a request. Other network resources can be employed in different embodiments.

The appname field identifies the application for the network resource to perform, such as applications in User Manager, Group Manager, or Organization Manager. The parameter fields (param1, param2, . . . ) identify parameters employed by the identified application. For example, param1 may be a function the identified application performs, and param2 may be a variable or other information required for carrying out the function. One example of a function is a search program that searches Directory Server 36 for entries with attributes corresponding to values in the request's parameters. In this example, the parameters may require Identity Server 40 to search Directory Server 36 for the employee entry for John Smith.

When the SOAP protocol is employed, a network resource, such as Identity Server 40, receives a request similar to the example described above, with a host:port value that informs Identity Server 40 that the SOAP protocol is in use. The request includes an XML document encapsulated in the SOAP protocol format.

Once a request is received (step 500, FIG. 12), Identity Server 40 determines whether any pre-processing is required for the request (step 502). Decryption is an example of one pre-processing operation. If pre-processing is required, Identity Server 40 performs the pre-processing operation (step 504). Once pre-processing is complete or if no pre-processing is required, Identity Server 40 translates the request (step 506). In one implementation, Identity Server 40 translates the request by identifying all programs to be performed in response to the request and the format for outputting the results from each program. Process steps for carrying out the translation are described in greater detail below.

Identity Server 40 performs the request (step 508) after the request is translated. In performing the request, Identity Server 40 retrieves and manipulates data in accordance with the functions identified in the request. After the request is performed, Identity Server 40 prepares an Output XML (step 510). The Output XML is a data file organized in accordance with formatting directions retrieved during the translation operation (step 506). In one embodiment of the present invention, the Output XML is formed using a XML template obtained during the translation process (step 506) and display characteristics. The XML template provides a data structure for the Output XML. The use of XML templates and display characteristics is described in greater detail below.

After preparing the Output XML, Identity Server 40 determines whether any post-processing is to be performed (step 512). Post-processing may include operations such as encryption. Embodiments of the present invention also provide for post-processing operations that further customize the Output XML. If post-processing is to be performed, Identity Server 40 carries out the post-processing operation (step 514).

After completing post-processing or if no post-processing is necessary, Identity Server 40 determines whether client-side processing will be used (step 516). In client-side processing, Identity Server 40 provides the Output XML data file to the requesting client through Web Server 20. In one embodiment, Portal Bridge 302 requests client-side processing, so that Portal Bridge 302 can format the Output XML according to the specifications of portal 312. In contrast, the client may elect to have Identity Server 40 perform server-side processing. In server-side processing, Identity Server 40 processes the Output XML to prepare a response to the request.

If client-side processing is chosen, Identity Server 40 prepares a client-side response (step 520). In one implementation, two different client-side responses are possible. The client may receive only the Output XML or both the Output XML and references to a set of XSL stylesheets that contain directives for converting the Output XML into an HTML display. In various embodiments of the present invention, the set of XSL stylesheets may contain one or multiple XSL stylesheets. The user (or client) then formats the Output XML for presentation or any other purpose the user desires. If client-side processing is not selected, Identity Server 40 prepares a server-side response (step 518). In one embodiment, Identity Server 40 combines the Output XML with a XSL stylesheet to obtain a HTML response for the client.

In one embodiment of the present invention, Identity Server 40 determines whether to perform client-side or server-side processing by examining a processing parameter in the request. In a further implementation, the processing parameter also indicates the desired client-side response from Identity Server 40, namely Output XML and XSL stylesheet references or Ouput XML and no XSL stylesheet references. If the processing parameter is set to equal "xmlnoxsl," Identity Server 40 prepares a client-side processing response including Output XML and no stylesheet references. If the processing parameter is set to equal "xml," Identity Server 40 prepares a client-side processing response including both output XML and references to a set of XSL stylesheets the client can access. If no processing parameter appears in the request, Identity Server 40 defaults to preparing a server-side processing response. In further embodiments, the request can also include a parameter expressly identifying a XSL stylesheet for Identity Server 40 to employ in preparing either a server-side or client-side response.

In another version of the present invention, Identity Server 40 employs a predefined list to determine whether to provide client-side processing or server-side processing. The list identifies browsers that desire client-side processing. If Identity Server 40 receives a request for a browser on the list, Identity Server 40 performs client-side processing. Otherwise, Identity Server 40 performs server-side processing. In a further embodiment, the list distinguishes between client-side processing providing Output XML and XSL stylesheet references and client-side processing providing Output XML and no XSL stylesheet references. The list may be updated by clients.

Once a response has been prepared, Identity Server 40 forwards the response to Web Server 20 (step 522), which forwards the response to the client (step 524).

In order to perform request translation (step 506, FIG. 12), Identity Server 40 maintains program service 560 and XML data registry 570, which are both depicted in FIG. 13. Program service 560 contains a list of the programs supported by applications running on Identity Server 40. Each function in the request corresponds to at least one program listed in program service 560. Each program listing in program service 560 contains a pointer to a program, as well as any peripheral programs to be performed in conjunction with the listed program. In alternate embodiments of the present invention, the peripheral programs can be identified in the request or a register file in XML data registry 570. An example of a peripheral program is the display of a navigation bar that accompanies the display of a request's results.

XML data registry 570 contains registration files. Each registration file corresponds to at least one program or peripheral programs listed in program service 560. Each registration file contains information necessary for structuring the output of a program's result. Identity Server 40 maintains a set of XML templates 572, XML schemas 574, and XSL stylesheets 576. Each registration file in data registry 570 contains a pointer to an XML template, an XML schema and XSL stylesheet. The application of templates and stylesheets will be explained below in greater detail. Schemas provide information to Identity System users for establishing display characteristics.

FIG. 14 illustrates steps performed by Identity Server 40 to translate a request (step 506, FIG. 12). In step 600, Identity Server 40 identifies programs corresponding to functions called for in the request, including peripheral programs. For each program explicitly identified in the request, Identity Server 40 finds a corresponding entry in program service 660. The corresponding entry contains a pointer to the explicitly identified program, as well as pointers to all peripheral programs to be performed in conjunction with the explicit program. In one embodiment, all explicitly identified programs for workflow related requests include peripheral programs for providing a workflow function navigation bar, a search bar/window, and a standard navigation bar. Other programs include peripheral programs for providing a standard navigation bar and a search window in a window with any displayed program results.

Identity Server 40 completes the request translation by retrieving XML templates and XSL stylesheets. Identity Server 40 retrieves a XML template for each identified program and peripheral program (step 602). Identity Server 40 retrieves each template from a register file in data registry

670. Each register file corresponds to at least one combination of an application and a program. Identity Server 40 retrieves a XSL stylesheet for each identified program and peripheral program (step 606). In one embodiment, Identity Server 40 retrieves each stylesheet from the same register files containing the retrieved XML templates.

The following provides an example of a registration file in one embodiment of the present invention:

```
© Oblix, Inc., 2001
<?xml version="1.0"?>
<ObProgramRegistry>
    <ObApplication name="the_application_name">
        <ObProgram name="a_program_name">
            <ObButton name="a_button_name"/>
            <ObButton name="yet_another_button_name"/>
            <ObButton name="and_maybe_more_button_names"/>
            ...
            ...
            <ObTemplate name="templatename.xml"/>
            <ObStyleSheet name="stylesheetname.xsl"/>
            <ObSehema name="XML_schema_name.xsd"/>
        </ObProgram>
        <ObProgram name="another_program_name">
            <ObStyleSheet name="Its_stylesheetname.xsl"/>
            <ObButton name="a_button_associated_with_it"/>
            <ObSchema name="Its_XML_schema_name.xsd"/>
        </ObProgram>
        <ObProgram name="and_so_on">
            ...
            ...
        </ObProgram>
        ...
        ...
    </ObApplication>
</ObProgramRegistry>
```

The ObProgramRegistry directive identifies the file as a registration file. The ObApplication instruction identifies an application. The ObProgram instruction identifies a program. Identity Server 40 uses the ObApplication and ObProgram values to identify the appropriate register file for retrieving a program's XML template, XML schema, and XSL stylesheet. For each program, Identity Server 40 locates the register file with the ObApplication and ObProgram values matching the request's application and program (steps 602 and 606).

Information within an ObProgram directive provides the template, schema and stylesheet for formatting a program's results as Output XML and an HTML document. The ObTemplate field specifies an XML template to be used with the program specified in the ObProgram field. The ObStyleSheet field identifies the XSL stylesheet for the program. The ObSchema field identifies the schema for the program. Identity Server 40 retrieves the identified template and stylesheet in steps 1702 and 1706 for each program identified in step 600.

In further embodiments, the register file contains additional information related to preparing an output display for a program's result. For example, one or multiple "ObButton" directives can be associated with a program combination when a button is to be displayed along with program results. The button field is used in preparing the button display for Identity Server 40. For example, it may be appropriate to display an acceptance button along with program results—calling for a user to accept displayed data. A typical button identifies the following characteristics: (1) graphical display; (2) mouse over text; and (3) link that will be invoked when the button is selected by the user. In one implementation, button information is dynamically determined, as opposed to being defined in a template. This link is one that will need to be modified by Portal Bridge 302 (step 392, FIG. 11).

The use of templates and stylesheets provides users with a great deal of flexibility and control. Templates and stylesheets can be modified to address the unique needs of system users. Different system users employing the same programs can create different displays of the program's results. Users and/or system administrators implement customized templates and stylesheets in desired register files. More details regarding templates and stylesheets can be found in U.S. patent application Ser. No. 09/997,410 now U.S. Pat. No. 6,782,379, entitled "Preparing Output XML Based on Selected Programs and XML Templates," which is incorporated herein by reference.

FIG. 15 provides a more detailed view of the steps taken by Identity Server 40 to prepare an Output XML for a request using XML templates and attribute display characteristics (step 510, FIG. 12). Identity Server 40 first prepares an XML data structure (step 630). The XML data structure is an organization of data based on the XML templates corresponding to the request's programs. The XML data structure combines the XML templates from each program to form a single data structure. This enables Identity Server 40 to provide a single response to a request instead of a response for each program in the request.

Identity Server 40 maps data retrieved in performing the request's programs into the XML data structure. In some instances, an XML template indirectly defines data to be retrieved—calling for data from an attribute based on the status of another attribute. For example, a search program may call for the name and e-mail address for each direct report of John Smith. In this example, an entry's name and e-mail address attributes for a person are returned, if another attribute in the entry identifies John Smith as the person's direct manager. Template elements calling for indirect proxies are also mapped into the XML data structure. Prior to mapping these elements into the XML data structure, Identity Server 40 prepares a data structure identifying each of the entries used to obtain the indirect proxy values.

After preparing the XML data structure (step 630, FIG. 15), Identity Server 40 transforms the XML data structure into Output XML (step 632). Identity Server 40 obtains attribute display characteristics for the retrieved attributes in the XML data structure. The display characteristics establish the display format of attribute data in the XML data structure. Attribute display characteristics identify a display type and relevant information for the display. For example, a text box display type and the length of the text box.

In one embodiment, Identity Server 40 obtains attribute display characteristics from directory entries in Directory Server 36. Each Directory Server entry corresponds to a different attribute type. For each attribute, Identity Server 40 locates a corresponding directory entry, which provides the attribute's display characteristics. In one such embodiment, a system administrator creates all the display attribute directory entries when Identity System 40 is configured. In alternate embodiments of the present invention, the directory entries are replaced by tables, data structures, or other means that relate display characteristics to attributes so the display characteristics can be obtained by Identity Server 40.

As explained above, the Output XML is combined with XSL stylesheets to obtain HTML displays. XSL stylesheets interpret directives integrated into the Output XML by the attribute display characteristics—providing instructions to Identity Server 40 or any other processing engine to implement the formatting called for by the attribute display characteristics. For example, the attribute display characteristics may have integrated directives into the Output XML indicating that a name, such as John Smith, is to be displayed according to a particular type. The identified type corresponds to a set of instructions in an XSL stylesheet that direct a processor to display the value John Smith with a particular font and size. In one example, the display type instructions in the XSL stylesheet indicate that the name John Smith is to be displayed in an Arial font with 12 point typeface.

Figure 16:
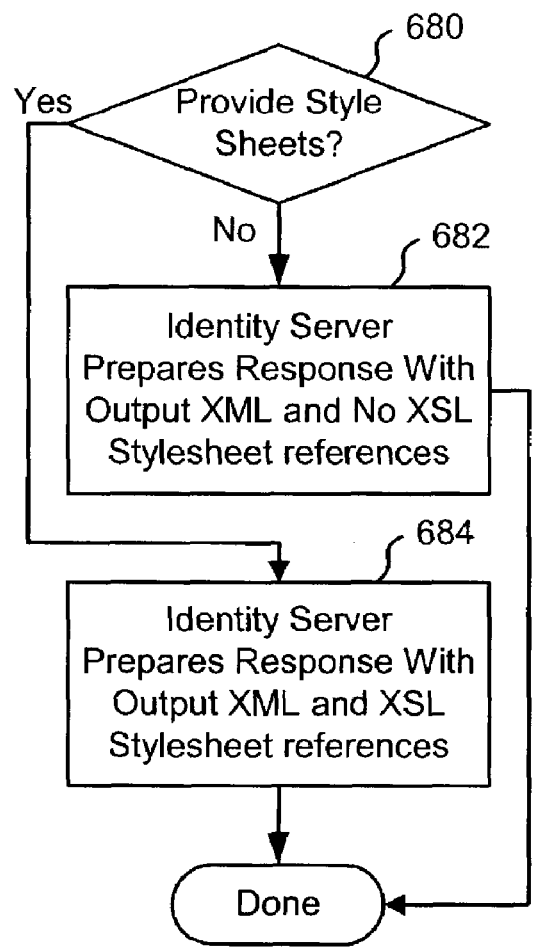
FIG. 16 is a flowchart describing a process for preparing a client-side response.

FIG. 16 describes the operations performed by Identity Server 40 to prepare a client-side response (step 520, FIG. 12). Identity Server 40 determines whether the client wishes to receive references to a set of XSL stylesheets (step 680). If the client wishes to receive XSL stylesheet references, Identity Server 40 prepares a response including Output XML and the associated XSL stylesheet references (step 684). Otherwise, Identity Server 40 prepares a response with Output XML and no XSL stylesheet references (step 682). Client-side processing is useful in several applications. In one instance, a client may wish to receive only Output XML for a third party application that does not require any display. This makes the display rules and information in the stylesheets useless. In another instance, a client's browser may do a superior job of combining Output XML and XSL stylesheets to form an output display. In this instance, client-side processing allows the client to use their own browser to combine Output XML and XSL stylesheets. In one embodiment, XSL stylesheet references are provided in the form of URLs in the Output XML.

Figure 17:
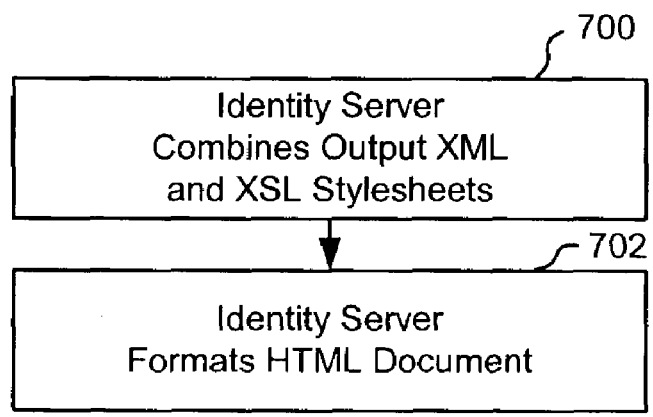
FIG. 17 is a flowchart describing a process for preparing a server-side response.

FIG. 17 shows the operation of Identity Server 40 in preparing a server-side response (step 528, FIG. 12). Identity Server 40 combines the Output XML with its associated XSL stylesheets (step 700). Identity Server 40 then formats the resulting combination as an HTML output document (step 702).

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A computer implemented method of servicing requests, comprising the steps of:
   receiving, at a portal bridge and from a first network resource, a first request for access to a requested resource;
   forwarding from said portal bridge a second request to a second network resource in response at least in part to receiving said first request;
   receiving, at said portal bridge, a response to said second request, wherein said response comprises a first version of a link to said requested resource;
   processing said response at said portal bridge, wherein processing said response comprises modifying said link to said requested resource from a first version to a second version, wherein the first version of said link directs a subsequent request directly to said requested resource, and wherein said second version of said link directs a subsequent request to said portal bridge, so that a third request is forwarded to said portal bridge when said link is triggered; and
   forwarding said response, including said second version of said link, to said first network resource, responsive to said first request for access;
   formatting a client-side response at the first network resource; and
   forwarding the client-side response to a client, so that the client side response can be displayed for a user.

2. A computer implemented method according to claim 1, wherein said first request originates from a portal in said first network resource.

3. A computer implemented method according to claim 1, wherein said first request addresses said portal bridge.

4. A computer implemented method according to claim 1, wherein forwarding a second request comprises:
   selecting a request parameter in said first request; and
   generating said second request, based at least in part on a value associated with said request parameter.

5. A computer implemented method according to claim 4, further comprising:
   forwarding a fourth request to a third network resource, in response at least in part to receiving said first request.

6. A computer implemented method according to claim 5, wherein forwarding a fourth request comprises:
   selecting a second request parameter in said first request; and
   generating said fourth request, based at least in part on a value associated with said second request parameter.

7. A computer implemented method according to claim 1, wherein said link is modified so that said third request includes a request parameter corresponding to a fourth request for said portal bridge to forward.

8. A computer implemented method according to claim 1, wherein said fourth request calls for said portal bridge to forward said fourth request to said second network resource.

9. A computer implemented method according to claim 1, wherein processing said response comprises:
   modifying a format of said response.

10. A computer implemented method according to claim 1, wherein processing said response comprises:
    aggregating said response with at least one other response.

11. A computer implemented method according to claim 1, wherein said response is forwarded as a portion of an aggregate response.

12. A computer implemented method according to claim 1, wherein said first request originates from a portal in said first network resource and forwarding said response comprises forwarding said response to said portal.

13. A computer implemented method according to claim 1, wherein said second network resource is part of an Identity System.

14. A computer implemented method according to claim 1, wherein said second network resource is part of an Access System.

15. A computer implemented method according to claim 1, wherein said second network resource is part of an integrated Identity/Access System.

16. A method according to claim 1, further comprising:
    displaying the client-side response for a user,
    wherein the request is routed to the content server through a corporate firewall.

17. One or more processor readable storage devices having processor readable code embodied on said one or more processor readable storage devices, said processor readable code being executable by one or more processors, said processor readable code comprising:
    code for receiving, from a first network resource, a first request for access to a requested resource;

code for forwarding a second request to a second network resource, in response at least in part to receiving said first request;

code for receiving a response to said second request, wherein said response comprises a link to said requested resource;

code for processing said response, wherein processing said response comprises modifying said link to said requested resource from a first version to a second version, wherein the first version of said link directs a subsequent request directly to said requested resource, and wherein said second version of said link directs a subsequent request to said portal bridge, so that a third request is forwarded to said portal bridge when said link is triggered; and code for forwarding said response, including said second version of said link, to said first network resource, responsive to said first request for access, so that the first network resource can forward a response to a client for display to a user.

18. One or more processor readable storage devices according to claim 17, wherein said first request originates from a portal in said first network resource.

19. One or more processor readable storage devices according to claim 17, wherein said processor readable code further comprises:

code for forwarding a fourth request to a third network resource, in response at least in part to receiving said first request.

20. One or more processor readable storage devices according to claim 19, wherein:

said step code for forwarding a second request comprises:

code for selecting a request parameter in said first request; and code for generating said second request, based at least in part on a value associated with said request parameter, and said code for forwarding a fourth request comprises:

code for selecting a second request parameter in said first request; and code for generating said fourth request, based at least in part on a value associated with said second request parameter.

21. One or more processor readable storage devices according to claim 20, wherein modifying said link comprises modifying said link so that said third request includes a request parameter corresponding to a fourth request for said portal bridge to forward.

22. One or more processor readable storage devices according to claim 21, wherein said fourth request calls for said portal bridge to forward said fourth request to said second network resource.

23. One or more processor readable storage devices according to claim 20, wherein said code for processing said response comprises:

code for modifying a format of said response.

24. One or more processor readable storage devices according to claim 20, wherein said code for processing said response comprises:

code for aggregating said response with at least one other response.

25. One or more processor readable storage devices according to claim 20, wherein said first request originates from a portal in said first network resource and said code for forwarding said response comprises code for forwarding said response to said portal.

26. One or more processor readable storage devices according to claim 17, wherein said processor readable code is for programming a portal bridge.

27. One or more processor readable storage devices according to claim 26, wherein said second network resource is part of an Identity System.

28. An apparatus, comprising:

one or more storage devices, having processor readable code embodied on said one or more processor readable storage devices; and one or more processors in communication with said one or more storage devices, said processor readable code being executable by said one or more processors, said processor readable code comprising:

code for receiving, from a first network resource, a first request for access to a requested resource;

code for forwarding a second request to a second network resource, in response at least in part to receiving said first request;

code for receiving a response to said second request, wherein said response comprises a link to said requested resource;

code for processing said response, wherein processing said response comprises modifying said link to said requested resource from a first version to a second version, wherein the first version of said link directs a subsequent request directly to said requested resource, and wherein said second version of said link directs a subsequent request to said portal bridge, so that a third request is forwarded to said portal bridge when said link is triggered; and code for forwarding said response, including said second version of said link, to said first network resource, responsive to said first request for access, so that the first network resource can forward a response to a client for display a user.

29. An apparatus according to claim 28, wherein said first request originated from a portal in said first network resource.

30. An apparatus according to claim 28, wherein said first request addresses a portal bridge.

31. An apparatus according to claim 28, wherein said processor readable code further comprises:

code for forwarding a fourth request to a third network resource, in response at least in part to receiving said first request.

32. An apparatus according to claim 28, wherein said code for processing said response comprises:

code for modifying a format of said response.

33. An apparatus according to claim 28, wherein code for processing said response comprises:

code for aggregating said response with at least one other response.

34. An apparatus according to claim 28, wherein said apparatus comprises a portal bridge.

35. An apparatus according to claim 34, wherein said second network resource is part of an Identity System.

36. A method of servicing requests, comprising the steps of:

receiving from a portal a first request for a first application in an Identity system;

selecting a first request parameter in said first request;

generating a second request, based at least in part on a value associated with said first request parameter;

forwarding said second request to a first network resource, in response at least in part to receiving said first request;

receiving from said portal a third request for a second application in said Identity system; and forwarding a fourth request to a second network resource, in response at least in part to receiving said third request, wherein said second network resource is not said first network resource;
formatting a client-side response at the portal; and
forwarding the client-side response to a client, so that the client side response can be displayed for a user.

37. A computer implemented method according to claim 36, wherein said first request and said third request address a portal bridge.

38. A computer implemented method according to claim 36, wherein forwarding a fourth request comprises:
selecting a second request parameter in said second request; and
generating said fourth request, based at least in part on a value associated with said second request parameter.

39. A computer implemented method according to claim 36, wherein said method further comprises:
receiving a first response to said second request;
receiving a second response to said fourth request;
processing said first response; and
processing said second response.

40. A computer implemented method according to claim 39, wherein:
processing said first response comprises:
modifying a first link in said first response, and
processing said second response comprises:
modifying a second link in said second response.

41. A computer implemented method according to claim 40, wherein:
said first link is modified so that a fifth request is issued to a portal bridge when said first link is triggered, and
said second link is modified so that a sixth request is issued to said portal bridge when said second link is triggered.

42. A computer implemented method according to claim 41, wherein said first request and said third request are received at said portal bridge, wherein said first response and said second response are processed at said portal bridge, and wherein said second request and said fourth request are forwarded from said portal bridge.

43. A computer implemented method according to claim 41, wherein:
said first link is modified so that said fifth request includes a request parameter corresponding to a seventh request for said portal bridge to forward; and
said second link is modified so that said sixth request includes a request parameter corresponding to an eighth request for said portal bridge to forward.

44. A computer implemented method according to claim 39, wherein:
processing said first response comprises:
modifying a format of said first response, and
processing said second response comprises:
modifying a format of said second response.

45. A computer implemented method according to claim 39, wherein:
processing said first response comprises:
aggregating said first response with at least one other response, and
processing said second response comprises:
aggregating said second response with at least one other response.

46. A computer implemented method according to claim 39, further comprising:
forwarding said first response to said first network resource after said first response has been modified.

forwarding said second response to said second network resource after said second response has been modified.

47. A computer implemented method according to claim 36, wherein said method is performed by a portal bridge.

48. A computer implemented method according to claim 47, wherein said first network resource and said second network resource are parts of said Identity System.

49. A computer implemented method according to claim 47, wherein said first network resource and said second network resource are parts of an Access System.

50. A computer implemented method according to claim 47, wherein said first network resource and said second network resource are parts of an integrated Identity/Access System.

51. A method according to claim 36, further comprising:
displaying the client-side response for a user.

52. One or more processor readable storage devices having processor readable code embodied on said one or more processor readable storage devices, said processor readable code being executable by one or more processors, said processor readable code comprising:
code for receiving from a portal a first request for a first application in an Identity system;
code for selecting a first request parameter in said first request;
code for generating a second request, based at least in part on a value associated with said first request parameter;
code for forwarding said second request to a first network resource, in response at least in part to receiving said first request;
code for receiving from said portal a third request for a second application in said Identity system; and
code for forwarding a fourth request to a second network resource, in response at least in part to receiving said third request, wherein said second network resource is not said first network resource;
code for formatting a client-side response; and
code for forwarding the client-side response to a client, so that the client side response can be displayed for a user.

53. One or more processor readable storage devices according to claim 52, wherein said first request and said third request address a portal bridge.

54. One or more process readable storage devices according to claim 52, wherein said processor readable code further comprises:
code for receiving a first response to said second request;
code for receiving a second response to said fourth request;
code for processing said first response; and
code for processing said second response.

55. One or more processor readable storage devices according to claim 54, wherein:
said code for processing said first response comprises:
code for modifying a first link in said first response, and
said code for processing said second response comprises:
code for modifying a second link in said second response.

56. One or more processor readable storage devices according to claim 55, wherein:
said first link is modified so that a fifth request is issued to a portal bridge when said first link is triggered, and
said second link is modified so that a sixth request is issued to said portal bridge when said second link is triggered.

57. One or more processor readable storage devices according to claim 56, wherein:
said first link is modified so that said fifth request includes a request parameter corresponding to a seventh request for said portal bridge to forward; and said second link is modified so that said sixth request includes a request parameter corresponding to an eighth request for said portal bridge to forward.

58. One or more processor readable storage devices according to claim 54, wherein:
said code for processing said first response comprises:
code for modifying a format of said first response, and
said code for processing said first response comprises:
code for modifying a format of said second response.

59. One or more processor readable storage devices according to claim 54, wherein:
said code for processing said first response comprises:
code for aggregating said first response with at least one other response, and
said code for processing said first response comprises:
code for aggregating said second response with at least one other response.

60. One or more processor readable storage devices according to claim 54, wherein said processor readable code further comprises:
code for forwarding said first response to said first network resource after said first response has been processed,
code for forwarding said second response to said second network resource after said second response has been processed.

61. One or more processor readable storage devices according to claim 52, wherein said processor readable code is for programming a portal bridge.

62. One or more processor readable storage devices according to claim 61, wherein said first network resource and said second network resource are parts of said Identity System.

63. An apparatus, comprising:
one or more storage devices, having processor readable code embodied on said one or more processor readable storage devices; and
one or more processors in communication with said one or more storage devices, said processor readable code being executable by said one or more processors, said processor readable code comprising:
code for receiving from a portal a first request for a first application in an Identity system;
code for selecting a first request parameter in said first request;
code for generating a second request, based at least in part on a value associated with said first request parameter;
code for forwarding said-second request to a first network resource, in response at least in part to receiving said first request;
code for receiving from said portal a third request for a second application in said Identity system; and
code for forwarding a fourth request to a second network resource, in response at least in part to receiving said third request, wherein said second network resource is not said first network resource;
code for formatting a client-side response; and
code for forwarding the client-side response to a client, so that the client side response can be displayed for a user.

64. An apparatus according to claim 63, wherein said first request and said third request address a portal bridge.

65. An apparatus according to claim 63, wherein said processor readable code further comprises:
code for receiving a first response to said second request;
code for receiving a second response to said fourth request;
code for processing said first response; and
code for processing said second response.

66. An apparatus according to claim 65, wherein:
said code for processing said first response comprises:
code for modifying a first link in said first response, and
said code for processing said second response comprises:
code for modifying a second link in said second response.

67. An apparatus according to claim 65, wherein:
said code for processing said first response comprises:
code for modifying a format of said first response, and
said code for processing said first response comprises:
code for modifying a format of said second response.

68. An apparatus according to claim 65, wherein:
said code for processing said first response comprises:
code for aggregating said first response with at least one other response, and code for processing said first response comprises:
code for aggregating said second response with at least one other response.

69. An apparatus according to claim 65, wherein said processor readable code further comprises:
code for forwarding said first response to said first network resource after-said first response has been processed.
code for forwarding said second response to said second network resource after said second response has been processed.

70. An apparatus according to claim 63, wherein said apparatus comprises a portal bridge.

71. An apparatus according to claim 70, wherein said first network resource and said second network resource are parts of said Identity System.

* * * * *

UNITED STATES PATENT AND TRADEMARK OFFICE
CERTIFICATE OF CORRECTION

| | | |
|---|---|---|
| PATENT NO. | : 7,428,523 B2 | Page 1 of 1 |
| APPLICATION NO. | : 10/354914 | |
| DATED | : September 23, 2008 | |
| INVENTOR(S) | : Tsang et al. | |

It is certified that error appears in the above-identified patent and that said Letters Patent is hereby corrected as shown below:

On the title page, item [56]:

On page 2, in column 2, under "Other Publications", line 11, delete "Verson" and insert -- Version --, therefor.

On page 3, in column 1, under "Other Publications", line 1, after "Office" insert -- Action --.

In column 17, line 60, delete "Ouput" and insert -- Output --, therefor.

In column 19, line 21, delete "<ObSehema" and insert -- <ObSchema --, therefor.

In column 21, line 54, in claim 1, after "resource" insert -- , --.

In column 22, line 32, in claim 8, delete "claim 1," and insert -- claim 7, --, therefor.

In column 25, line 67, in claim 46, delete "modified." and insert -- modified, --, therefor.

In column 28, line 33, in claim 68, after "and" insert -- said --.

In column 28, line 40, in claim 69, delete "after-said" and insert -- after said --, therefor.

In column 28, line 40, in claim 69, delete "processed." and insert -- processed, --, therefor.

Signed and Sealed this

Fifth Day of October, 2010

David J. Kappos
*Director of the United States Patent and Trademark Office*